(12) United States Patent
Teron

(10) Patent No.: US 9,670,670 B2
(45) Date of Patent: Jun. 6, 2017

(54) FORCED AIR RADIANT HEATING UTILICORE AND MODULE AND BUILDING INCORPORATING SAME

(75) Inventor: William Teron, Kanata (CA)

(73) Assignee: URBANETICS INC., Kanata (CA)

( * ) Notice: Subject to any disclaimer, the term of this patent is extended or adjusted under 35 U.S.C. 154(b) by 610 days.

(21) Appl. No.: 13/821,282

(22) PCT Filed: Sep. 16, 2011

(86) PCT No.: PCT/CA2011/001031
§ 371 (c)(1),
(2), (4) Date: Mar. 7, 2013

(87) PCT Pub. No.: WO2012/034217
PCT Pub. Date: Mar. 22, 2012

(65) Prior Publication Data
US 2013/0168041 A1    Jul. 4, 2013

(30) Foreign Application Priority Data

Sep. 17, 2010 (WO) ................ PCT/CA2010/001435

(51) Int. Cl.
*F24D 11/02* (2006.01)
*E04B 5/48* (2006.01)
(Continued)

(52) U.S. Cl.
CPC ................ *E04B 5/48* (2013.01); *E04C 2/525* (2013.01); *F24D 3/14* (2013.01); *F24D 3/145* (2013.01);
(Continued)

(58) Field of Classification Search
CPC ... E04B 5/48; E04C 2/525; F24D 3/14; F24D 3/145; F24D 7/163; F24D 11/0214; F24F 5/0089; Y02B 80/40; Y02B 30/126
See application file for complete search history.

(56) References Cited

U.S. PATENT DOCUMENTS 2,306,107 A * 12/1942 Henderson .............. B28B 7/241
                                                  249/101
2,559,198 A * 7/1951 Ogden ...................... E04B 5/48
                                                  165/136
(Continued)

FOREIGN PATENT DOCUMENTS

CA         2144938 A1    9/1996
CH          691138 A5    4/2001
(Continued)

OTHER PUBLICATIONS

International Search Report for PCT/CA2011/001031, mailed Jan. 13, 2012; ISA/CA.

*Primary Examiner* — Jeanette E Chapman
(74) *Attorney, Agent, or Firm* — Harness, Dickey & Pierce, P.L.C.

(57) ABSTRACT

An HVAC duct or utilicore for substantially containing air flowing longitudinally therethrough has at least one wall comprised of a poured high thermal mass material with at least one pipe embedded therein during a pouring process, the at least one pipe for circulating a fluid throughout the at least one wall at a temperature that is different from an ambient temperature of the air flowing through the utilicore, for effecting heat transfer through the at least one wall between the fluid in the at least one conduit and the air flowing through the utilicore. A side wall of an elongate monolithic poured concrete building construction module, having a substantially planar main wall and at least one side wall extending substantially parallel to a longitudinal axis, having a pipe embedded therewithin, may form at least a portion of an element that defines the utilicore. A story-defining structure for a building may comprise a plurality of at least one of such construction modules, each module supported at least two points by a support structure, each module being oriented such that distal ends of the side walls (Continued)

thereof engage the support structure, the at least one side wall and the main wall defining an elongate arch, the modules being juxtaposed in parallel relation to define at least one elongate utilicore between the arches. The support structure may comprise one or more modules employed as substantially horizontal beams or substantially vertical columns or both.

8 Claims, 12 Drawing Sheets

(51) Int. Cl.
  *E04C 2/52*    (2006.01)
  *F24D 3/14*    (2006.01)
  *F24F 5/00*    (2006.01)
  *F28D 7/16*    (2006.01)

(52) U.S. Cl.
  CPC ........ F24D 11/0214 (2013.01); F24F 5/0089 (2013.01); F28D 7/163 (2013.01); *Y02B 30/126* (2013.01); *Y02B 80/40* (2013.01)

(56) References Cited

U.S. PATENT DOCUMENTS

| | | | | | |
|---|---|---|---|---|---|
| 2,621,027 | A * | 12/1952 | Tatsch | ...................... | F24D 5/10 165/126 |
| 2,843,364 | A * | 7/1958 | Kahr | ...................... | F24D 3/147 165/56 |
| 3,376,919 | A * | 4/1968 | Canepa | ..................... | E04B 5/48 165/53 |
| 3,442,058 | A | 5/1969 | Naslund et al. | | |
| 3,908,324 | A * | 9/1975 | Stout | ...................... | E04B 1/161 52/100 |
| 4,142,340 | A * | 3/1979 | Howard | ................... | E04B 1/04 52/262 |
| 4,168,740 | A * | 9/1979 | Cairenius | ................. | F28F 3/12 165/174 |
| 4,212,348 | A * | 7/1980 | Kobayashi | ................ | F24D 3/14 165/136 |
| 4,250,674 | A * | 2/1981 | Feist | ......................... | E04B 5/48 52/220.3 |
| 4,300,320 | A * | 11/1981 | Rooney | ................... | E01C 11/26 14/73 |
| 4,369,836 | A * | 1/1983 | Bleckmann | ................ | F24J 2/26 126/661 |
| 4,415,798 | A * | 11/1983 | Knappe | ................... | F24D 3/142 219/213 |
| 4,589,330 | A | 5/1986 | Teron | | |
| 4,703,597 | A * | 11/1987 | Eggemar | ................ | A63C 19/10 165/168 |
| 5,103,604 | A * | 4/1992 | Teron | ................... | E04B 1/34861 52/126.3 |
| 5,342,470 | A * | 8/1994 | Meirana | ................. | B29C 65/20 138/155 |
| 5,850,503 | A * | 12/1998 | Onken | .................... | F24H 1/208 219/523 |
| 6,021,646 | A * | 2/2000 | Burley | ................... | A63C 19/10 165/45 |
| 6,092,587 | A * | 7/2000 | Ingram | ..................... | F24D 3/14 165/171 |
| 2006/0251851 | A1* | 11/2006 | Bowman | ................. | E04B 5/043 428/71 |
| 2007/0151704 | A1* | 7/2007 | Elmore | .................... | F24J 3/081 165/45 |
| 2008/0142610 | A1 | 6/2008 | Bastow | | |
| 2008/0148673 | A1* | 6/2008 | Keller | .................... | F24D 3/142 52/592.1 |
| 2009/0001185 | A1* | 1/2009 | Kroll | ........................ | F24D 3/14 237/60 |
| 2011/0286724 | A1* | 11/2011 | Goodman | ............... | F28D 19/04 392/346 |
| 2012/0248099 | A1* | 10/2012 | Nadarajah | ............... | B63B 25/16 219/756 |

FOREIGN PATENT DOCUMENTS

| | | | | |
|---|---|---|---|---|
| DE | 4018632 A1 | 2/1991 | | |
| DE | 10 2007 055 134 A1 | 1/2009 | | |
| GB | 559872 A * | 3/1944 | ............... | F24D 3/14 |
| GB | 2 478 739 A | 9/2011 | | |
| JP | 05239904 A * | 9/1993 | | |
| WO | WO-2011/018088 A2 | 2/2011 | | |
| WO | WO-2012/034207 A1 | 3/2012 | | |

* cited by examiner

FORCED AIR RADIANT HEATING UTILICORE AND MODULE AND BUILDING INCORPORATING SAME

CROSS-REFERENCE TO RELATED APPLICATIONS

This application is a 371 U.S. National Stage of International Application No. PCT/CA2011/001031, filed Sep. 16, 2011, which claims priority to International Application PCT/CA2010/001435, filed Sep. 17, 2010, the disclosures of which are herein incorporated by reference in their entirety.

TECHNICAL FIELD

The present disclosure relates to HVAC systems and in particular to an HVAC duct or utilicore having at least one wall comprising a high thermal mass material with an embedded radiating fluid pipe, to a modular precast prefabricated construction module incorporating such utilicores therewithin and to buildings constructed from such modules in which such utilicores define a forced air radiant HVAC system.

INTRODUCTION

It is generally accepted that in order to condition and distribute air in a building, the air is contained and handled.

Despite numerous innovative building designs and construction techniques, heating and/or cooling of buildings, especially commercial buildings, has conventionally employed forced air central heating and cooling. Such conventional systems employ a major primary heating and/or cooling source and a major air handling facility, to re-heat and re-cool the air, as well as a major network of distribution ducts and major mechanical devices to force the air throughout the building over long distances away from the central source and return the air back again. The conventional central source heats (or cools) the circulated air to a temperature that is different (higher to provide heating and lower to provide cooling) than the ambient temperature of the building spaces being heated or cooled. Indeed, the temperature is raised (or lowered) beyond the desired temperature to take into account energy losses incurred during transport. Additionally, the air is distributed at a velocity to substantially ensure circulation of the air throughout the building and back to the central source.

Such heating and cooling mechanisms are expensive to design, install, operate and replace, inefficient, cumbersome and noisy.

The energy expended in heating and/or cooling the circulated air and to transport such conditioned air throughout the building results in considerable expense. Still further, heating the supplied air at a single plant located at an extremity of the building involves a considerable amount of energy expenditure.

As well, the process of heating the air is inefficient. Moreover, thermal loss, as the air is transported throughout the building, means that the heating or cooling effect, as the case may be, may not be equally realized in all parts of the building. Accordingly, it is frequently difficult to provide a desired amount of heating and cooling throughout the entire building, even if it is to be maintained at a constant temperature.

An elaborate network of air-carrying ducts, typically constructed of galvanized metal or other thin metal sheeting, is distributed throughout the building, to circulate the heated and/or cooled air. The primary vertical and horizontal distribution ducts that allow the air to be moved from the central source to the various floors of a building are usually independent of the building's structural system and take up a large amount of valuable space. Since all air comes from the central source, the largest duct is the cumulative size of all secondary ducts, which can be very large. Typically, numerous sensors and controllers are employed to provide a modicum of control over the temperature distribution of the circulated air throughout the building and a number of personnel are employed to set up, monitor and maintain the air quality in the building.

As the forced air is circulated through the flimsy sheet metal ducts, the velocity of the air being moved, which ensures the circulation of the air throughout the building, often causes the sheet metal to vibrate, bend and buckle, causing noise. Furthermore, because of the inherent structural weakness in the duct sheeting material, the ducts, which reduce the available headroom on each floor, are generally dedicated solely to the HVAC function and do not perform any other significant functions such as load-bearing structural support.

As a result, conventional sheet metal duct heating systems typically employ a dropped ceiling to hide these mechanical devices. The dropped ceiling height is added to the interior height of the building for each floor, which adds to the total volumetric dimensions of the total building (or correspondingly reduces effective floor height). The dropped ceiling is normally constructed with removable tile that is less durable than permanent materials such as concrete. The tile material soon ages the building, due to discolouration and breakage (which frequently occurs during building maintenance activities). This may reduce the attractiveness of the building and concomitantly, its financial revenue and capital value.

U.S. Pat. No. 4,589,330 issued May 20, 1986 to Teron ("Teron No. 1") and entitled "Ceiling Structure", which is incorporated by reference in its entirety herewith, discloses a combined ceiling, air distribution system, mechanical chasse and structural roof member for a building formed by a plurality of parallel inverted U-shaped modules, which are supported in a common horizontal plane. The flanges of adjacent modules are spaced apart and define the side walls of a duct, top and bottom walls for the duct also being supported between the adjacent modules. The duct may be of any suitable dimension, and in particular may be sufficiently large as to handle air flow requirements for the heating, ventilating or air conditioning system for the building. The duct may also accommodate other services, such as electrical, plumbing, compressed air, etc. This arrangement dispenses with a suspended ceiling throughout the building which has conventionally been provided beneath the duct work and service lines attached to the ceiling of a building. Similar U-shaped modules are used as horizontal beams to support the U-shaped cross-members and others are used as vertical columns to support the beams. The hollow space inside the U-shaped beams and columns are then used as the distribution ducts to supply and return air to and from the main cross-members.

Buildings constructed using the Teron No. 1 module may still have installed therein conventional central forced air HVAC systems substantially as described above.

Canadian Patent No. 2,144,938 issued Sep. 18, 1996 to Teron ("Teron No. 2") and entitled "Method of Manufacturing Building Modules and Structures Formed Thereby", which is incorporated by reference in its entirety herein, discloses a molding assembly comprising a U-shaped mesh, U-shaped formwork and pieces removably fixed to opposite edges of the mesh in parallel planes orthogonal to planes of the U-shaped mesh, the framework end pieces having a width at least as thick as walls of a U-shaped module to be case therebetween and enveloping the mesh, and having opposite edges containing the mesh therebetween.

The cost of installing radiant heating/cooling piping in floors or walls in conventional technologies is labour intensive, involves custom pre-planning and engineering and may lack a capability to condition or distribute the air to other parts of the building where it may be appropriate.

PCT International Application No. PCT/CA2010/001435 ("Teron No. 3") filed internationally on Sep. 17, 2010 by Teron and entitled "Composite Building Module with a Thermal Mass Radiator", which is incorporated by reference in its entirety herewith, discloses a precast monolithic concrete prefabricated, self-supporting building construction module formed of a substantially planar main wall and at least one substantially planar side wall integral therewith. The at least one side wall terminates at one end at a corresponding end of the main wall. The main wall has a length and each of the at least one side walls has a length extending in a first direction substantially normally away from the main wall sufficient to substantially enclose and define walls of a standard facility, the at least one side wall supporting the main wall to cause the module to be freestanding while devoid of lateral support. The main wall has embedded therewithin a radiator pipe for circulating a fluid at a temperature that is different from an ambient temperature of the modular component within the main wall. Modular components comprising a U-shaped module having an elongate straight section with two side walls, an L-shaped module having one side wall and an in-fill panel having no side walls may be used in combination to define rooms on a floor surface and to form a building structure.

However, radiant heating typically suffers from an inability to actively control the air, supply and condition the air, which inevitably involves air handling. Moreover, radiant heating/cooling systems do not provide any air distribution or ventilation, which is desirable in commercial buildings with a large number of occupants and which may have industrial applications.

Further, radiant heating/cooling systems installed on an open floor or wall surface typically have a slow response time, especially in comparison to conventional central forced air HVAC systems. It is thus generally believed to be inefficient and expensive to employ radiant heating and cooling systems as the sole HVAC system in commercial buildings. As a result, radiant heating, to provide effective heating/cooling capability, typically employs a second air system to distribute and control the air.

In "Thermal Mass and Energy Performance" by Hall and published in the March/April 2010 issue of SABMag at pp. 20-24 ("Hall"), which is incorporated by reference in its entirety herein, radiant systems are disclosed in which heating/cooling coils are cast into wall elements. Hall also discloses forced air ventilation systems that draw in cool night air through the voids formed in pre-cast hollow-core concrete slabs that cool the slabs' mass in the process. However, it is apparent that the radiant systems and the hollow-core slabs disclosed by Hall are different and unrelated approaches, since pre-case concrete hollow-core slabs are extruded after casting to for the small voids longitudinally therein and, as such, are not formed with coils embedded in such slabs during the casting or pouring process.

"Double T" slabs are described in "Precast/Prestressed Concrete Structural Floor & Roof Systems Technical Brochure", published by the Canadian Precast/Prestressed Concrete Institute, which is incorporated by reference in its entirety herein. Such slabs have a back slab with two descending protrusions spaced such that when two double-T slabs are aligned side to side, the spacing between the protrusions of each slab is substantially the same as the spacing between a protrusion of one of the double-T slabs and a proximate protrusion of an adjacent double-T slab.

Buildings employing double-T slabs as floor/ceiling elements may have mechanical systems deployed between any of the protrusions and may be hidden by employing suspended ceilings engaging the lower extremities of the protrusions, thus sacrificing available headroom by an amount substantially equal to the height of the protrusions.

The spacing of the side slabs create a situation where each space is too large to serve as a duct for the transport of forced air and too small to serve as a domed ceiling adequate to form regular-sized rooms.

BRIEF DESCRIPTION OF THE DRAWINGS

Example embodiments of the present disclosure will now be described by reference to the following figures, in which identical reference numerals in different figures indicate identical elements and in which.

DESCRIPTION

Figure 1:
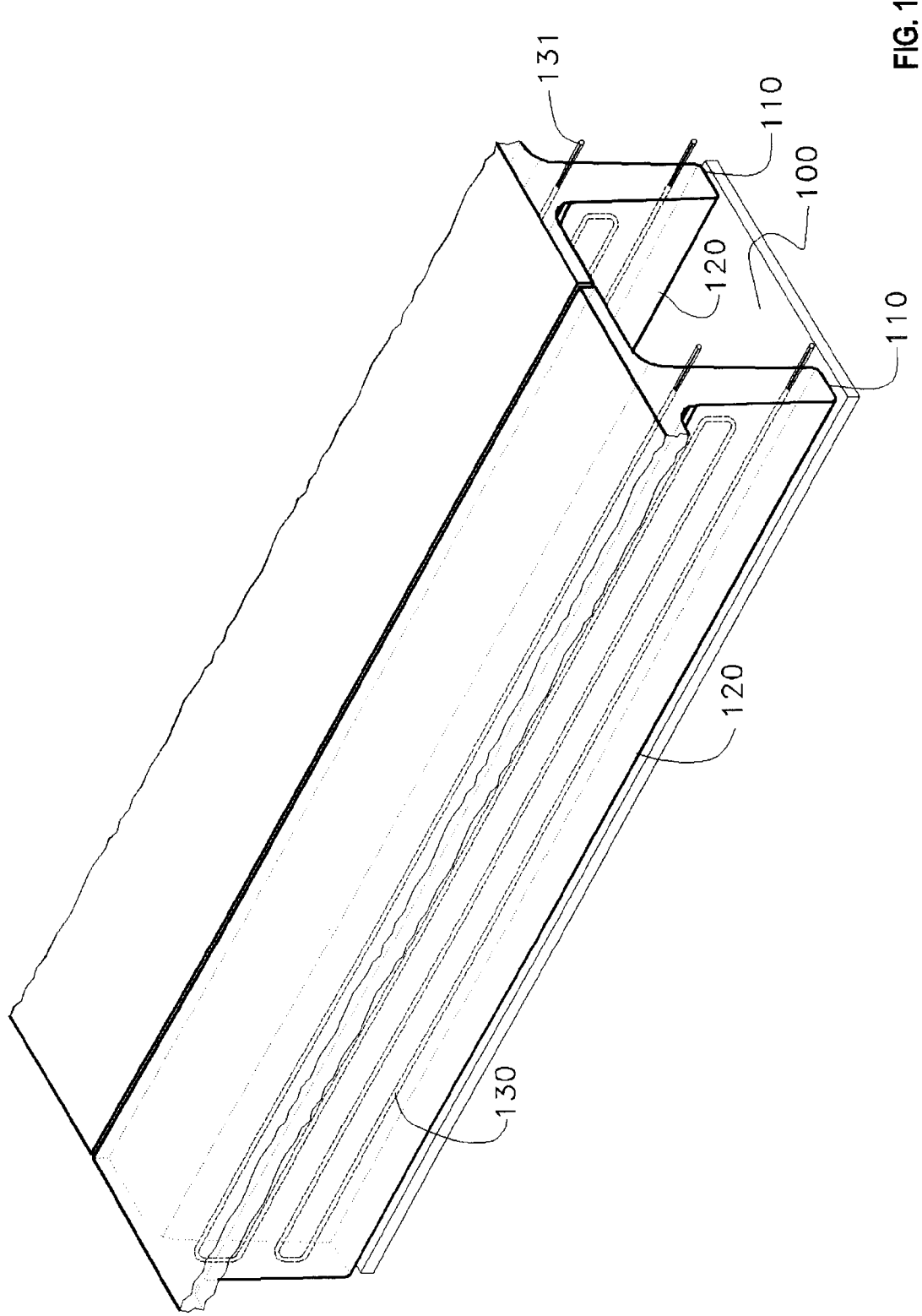
FIG. 1 is a partial isometric view of an example of a utilicore formed by juxtaposing two larger elements in accordance with an example embodiment of the present disclosure.

The present disclosure provides an example embodiment of an HVAC utilicore, having at least one wall comprised of a poured high thermal mass material, having embedded therewithin, during a pouring process, a pipe for circulating, throughout the at least one wall, a fluid at a temperature that is different from an ambient temperature of the air in the pipe, and for effecting heat transfer between the fluid and air flowing through the utilicore.

Employing forced air radiant heating and cooling through the described utilicore with high thermal mass and having embedded radiant piping overcomes limitations of conventional floor or wall-based radiant heating technologies, including lack of air movement, conditioning and distribution.

Using concrete as the ducting system throughout a building achieves a rating of a "heavy" thermal structure, as described in Hall that has a maximum potential to retain and release heating/cooling throughout a building. The extensive concrete thermal mass in the utilicore maximizes capture of ambient, passive and active heating/cooling throughout the building, the thermal mass acting as energy batteries for the entire building, retaining the heating and cooling energy within the building and reducing the size and cost of a primary source of heating and cooling.

The utilicore employs its thermal mass properties, in conjunction with the embedded heating and cooling radiant piping, to retain and release heating and cooling and provide the primary source of heating and cooling.

In some example embodiments, the radiant pipes incorporated within each module heat and cool the air within the full length of every module and serve as the primary source of heating and cooling. Only the fluids circulated through the embedded pipes are returned, in a much reduced manner, to a central fluid circulation resource. In some example embodiments, such a fluid resource in a building comprises fluid sources and/or circulators and/or boilers and/or chillers, that deliver hot or cold fluid to the network of pipes embedded within the utilicores, to baseboard radiators that may be placed along the external walls of the building, or both.

In some example embodiments, the air supplied from an air supply in a building is not heated or cooled by a central heating/cooling facility. Rather, the air flowing through the utilicore, is heated and cooled by the utilicore and serves every part of the building. The substantially large cross-section of the utilicore relative to conventional sheet metal ducting provides excess capacity to transfer heated or cooled air throughout a building to compensate for the various orientations of spaces within the building and variable heating/cooling loads and demands. Additionally, it permits deployment of a low velocity air system which in turn may result in significantly lowered air noise levels. This may be particularly advantageous in offices, schools, theatres or other structures, where the reduction of environmental noise may be a concern.

In some example embodiments of the disclosed system, a looped system of modules allow the air to return internally, all the while being re-heated or cooled by the thermal mass radiant heating and cooling within all modules. The substantial elimination of long air travel time reduces heat loss attendant with such conventional return air systems, as well as the cost of ducts and mechanical systems used to move such a large volume of air to a central facility. Further, the substantial elimination of a return air system to a central location significantly reduces the cost and maintenance of such a system.

In some example embodiments, the primary supply and return ducts, and in some example embodiments the secondary supply and return ducts, are looped and in some example embodiments, cross-looped. In some example embodiments, the ducts have motorized dampers at junctions, which may be activated by thermostats to adjust to a requested temperature, to extract the air or to have it re-circulated.

In some example embodiments, to provide even more precise heating/cooling demands to each location, Variable Air Volume (VAV) diffusers activated by individual thermostats, may be installed within utilicores.

This permits dispensing with a return air system, such as is employed in a conventional radiant heating and cooling HVAC installation where all of the air is returned to the central heating/cooling equipment before being sent back. Conversely, in this disclosure, the air remains in localized parts of the building.

As a result of the foregoing, considerable cost, energy and operational efficiencies, as well as improved HVAC performance may be observed in installations employing the described utilicore.

The rigidity of the utilicore may also serve to house mechanical systems including service utility conduits and fire suppression systems.

The present disclosure also describes a composite modular precast pre-finished concrete structural module, reconfigured from the module described in Teron No. 1, into a double-T configuration by the addition of integral transversely extending wings and by energizing the side walls with embedded heating/cooling radiant pipes. This allows the area defined by the wings and side walls to define a utilicore that acts as a forced air distribution duct, with the radiant pipe acting as a primary source of heating/cooling in a building constructed using such module.

The advantages of using concrete as a "heavy" thermal mass structure are intensified if the disclosed module is employed to form structural cross-elements throughout the building, in part because the structural elements are pre-finished, thus permitting them to remain exposed. When concrete with heavy thermal mass is not pre-finished and is covered in other finishing materials, such as gypsum board, the benefits of thermal mass are reduced.

The relatively narrow utilicores extend between wide pre-finished vaulted ceiling arches, which are aesthetically pleasing and provide increased headroom to the building spaces.

When the disclosed module is further employed as a structural element of the building to form beams and/or columns with an array of available utilicores, substantially all of the air in the building passes the full length of all the main concrete supply and return utilicores formed along the floor/ceiling cross-elements, as well as the secondary distribution supply and return utilicores, formed along the beams and/or columns. These ducts and utilicores may form the primary heating and cooling sources of the building, providing a complete forced air radiant heating and cooling system throughout the entire building at little or no additional cost, since the only substantial additional cost involves embedding pipes into the side walls of each module during the casting process.

As described in Teron No. 1, the use of the composite precast pre-finished module as a floor/ceiling (and/or beam and/or column) building product provides structure, pre-finishing and lighting infrastructure.

The disclosed module thus takes advantage of the manufacturing costs absorbed by provision of the structural and infrastructural features of the composite module, the budget for all the finishing of the ceiling in a building, as well as the ability offered by utilization of the module, to lower construction costs related to: transportation of materials to the site, lifting material into the building and planning, designing, managing and supervising the construction process. The value added by incorporating a radiant heating and cooling pipe into a forced air system may be substantial, while the cost of incorporating the radiant piping into existing construction molds and manufacturing systems may be minimal.

Furthermore, the radiant heating capability provided by the utilicore disclosed herein achieves further savings related to: substantially dispensing with the cost of designing, providing and installing an independent additional system to provide conventional forced air heating/cooling capability as well as handcrafting a radiant heating piping system.

As a result, it is anticipated that the entire building construction process, as well as the provision of radiant heating and cooling capability, may be achieved at a fraction of the cost of conventional installation.

In some example embodiments, the movement of air through the utilicore is caused by negative pressure created by the chimney effect within major vertical air ducts. The chimney effect is caused by the principle that hot air rises, and the higher the column, the greater the chimney effect or flow of air in the column. As air is drawn up a column by the chimney effect, it is able to draw air from adjacent parts of the building. In some example embodiments, forced air is created by using natural or mechanical means to create a negative pressure in return air columns, initiating and maintaining the chimney effect. In such fashion, the air distribution system conventionally employed in forced air HVAC systems may be significantly reduced in size or even obviated.

In some example embodiments, natural fresh air is introduced into the air system at a base level, through air supply columns designed to pre-heat or cool the natural fresh air. In some example embodiments, geothermal based air or liquid sources may be employed to perform such pre-heating/pre-cooling to achieve still greater efficiencies.

Accordingly, in addition to the considerable savings that may be achieved by employing the disclosed module in building construction, employing the disclosed module may result in considerable cost savings during operation.

The present disclosure will now be described in detail for the purposes of illustration only, in conjunction with certain embodiments shown in the enclosed drawings.

The Utilicore Concept

The present disclosure introduces a concept known as a utilicore. As shown in FIG. 1, a utilicore, shown generally at 100, acts as an integrated heating/cooling source and as an HVAC duct. In some example embodiments, the utilicore 100 is formed by adjacent modules 110, which are described in greater detail below, under the heading entitled "The Module".

Figure 8:
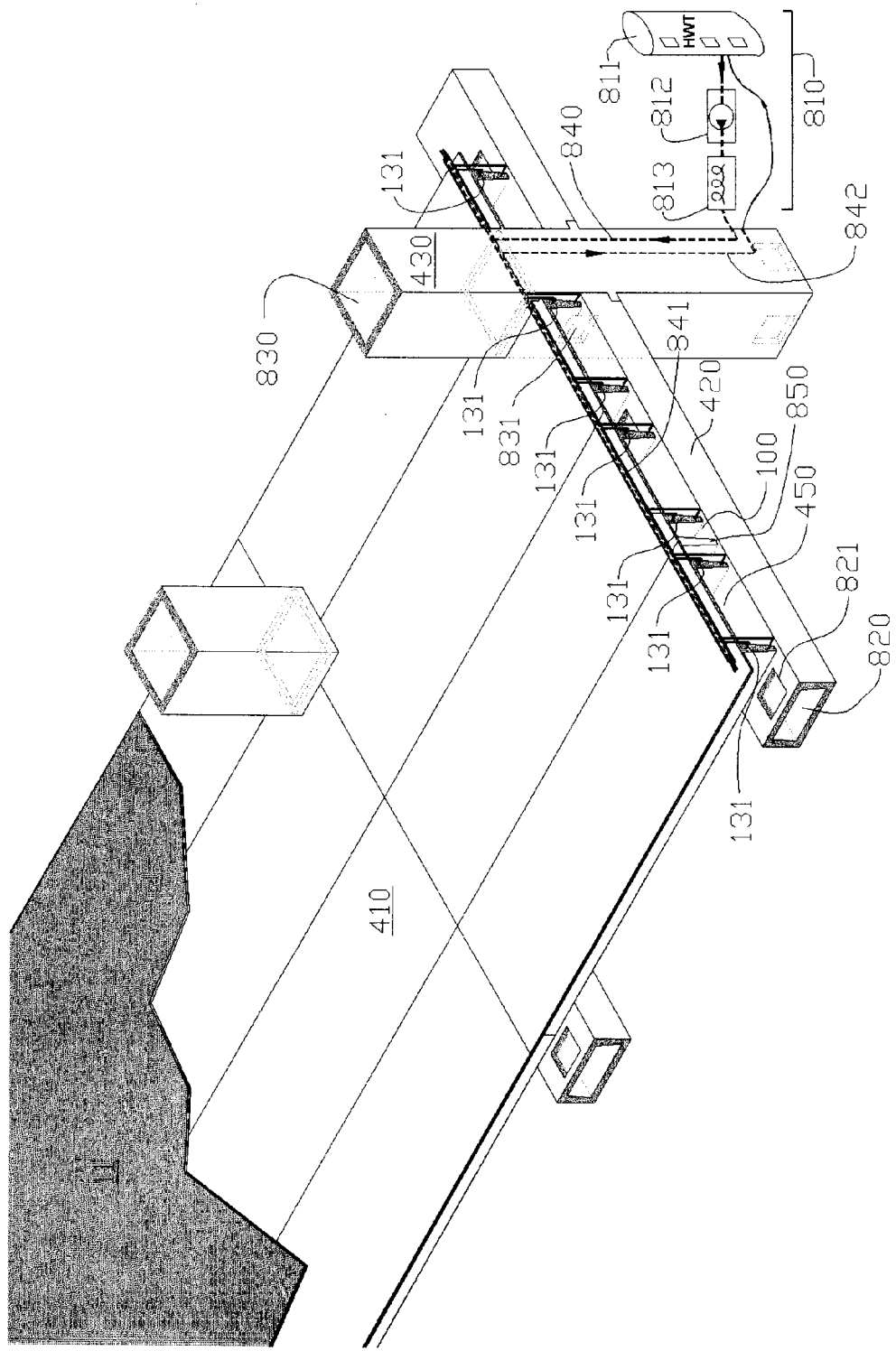
FIG. 8 is an isometric view from above, partially cutaway, of a portion of an example embodiment of at least one storey of the building of FIG. 4, showing an example of radiant heating/cooling fluid circulation loops throughout utilicores according to FIG. 1, defined by modules according to FIG. 2, and employed as structural elements including cross-elements, beams and columns.

In some example embodiments, the utilicore 100 has or is defined by walls 120 composed of a poured high thermal mass material, such as concrete, with a radiating fluid pipe 130 embedded during a casting or pouring process. The pipe 130 is supplied with fluid that circulates through it at a temperature that is different from an ambient temperature of air flowing through the utilicore 100. In some example embodiments, the fluid is circulated through the pipe 130 in a closed loop system from a central fluid circulating resource 810 (FIG. 8).

The air is contained and flowed under pressure through the concrete utilicore 100, without any additional metal ductwork, for distribution throughout a building 400 (FIG. 4) or portion thereof.

However, unlike conventional forced air HVAC systems employing ducts, the air flowing through the utilicore 100 is substantially continuously heated and cooled primarily, if not solely, by fluid flowing through the pipe 130 within its walls. The walls 120, composed of a high thermal mass material, such as concrete, with an embedded pipe 130, effect heat transfer between the air flowing through the utilicore 100 and fluid passing through the pipe 130, which is at a temperature that is different than an ambient temperature of air flowing through the utilicore 100.

Thus, the utilicore 100 may provide forced air radiant heating capability, in which the fluid in the pipe 130 is at a higher temperature than the ambient temperature of air flowing through the utilicore 100, so that heat radiates from the pipe 130, through the high thermal mass material wall 120 and into the air flowing through the utilicore 100. By doing this, the concrete has been converted from a passive element to a dynamic element in the heating and cooling of a building.

Similarly, the utilicore 100 may provide forced air radiant cooling capability, by ensuring that the fluid in the pipe 130 is at a lower temperature than the ambient temperature of air flowing through the utilicore 100, so that heat radiates from the air flowing through the utilicore 100, through the high thermal mass material wall 120 and into the fluid circulating through the pipe 130.

If, as in some example embodiments, a network of utilicores 100 extend through the entire building, the length of time that energy radiates between the pipe 130 and the air flowing through the utilicores 100 may permit effective heating/cooling of the air for circulation throughout the building, without initially heating or cooling the air and without returning the air to a central air handling supply facility, as is done in conventional forced air HVAC systems.

Circulation of heated/cooled fluid in small pipes 130 through all the utilicores 100 is understood to be more efficient than circulation of large quantities of heated/cooled air, along separate large supply and return ductwork systems, at great distances to a central heating source to be heated/cooled and back again. In this way, heating and cooling losses may also be substantially reduced.

In some example embodiments, forced air radiant heating/cooling capability may be provided by a utilicore 100 defined by walls 120, at least one of which is composed of a high thermal mass material, of which at least one of which walls 120 has an embedded pipe 130.

The Module

Figure 2:
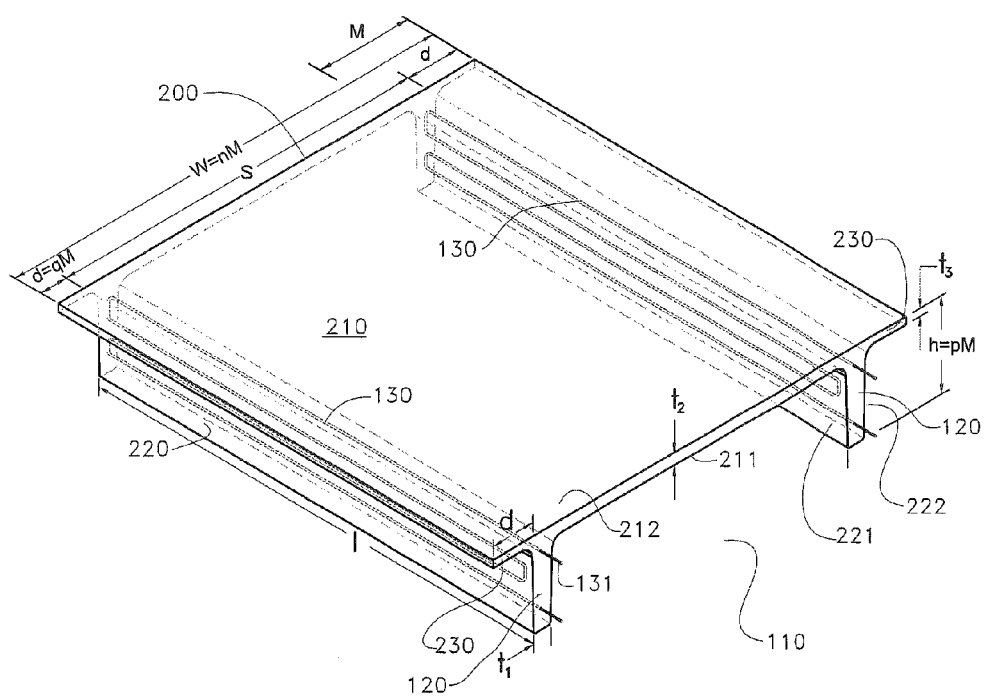
FIG. 2 is an isometric view of an example embodiment of a module with a thermal mass radiator embedded within its side walls in accordance with an example embodiment of the present disclosure.

Referring to FIG. 2, there is shown an isometric view of an example embodiment of an elongate construction module 110, comprising a precast concrete unitary structure having a planar main wall 210 and two planar side walls 120 extending substantially normally outwardly from a common surface 211 of main wall 210 in spaced-apart configuration and being integral therewith.

In some example embodiments, the side walls 120 extend from positions inset from the opposing ends of main wall 210, to define transverse outwardly extending wings 230, in some example embodiments, of substantially equal width d, thus imparting a generally double-T shaped configuration to the module 110 along its longitudinal axis.

In some example embodiments (not shown), the side walls 120 extend from substantially each of the opposing ends of main wall 210, thus imparting a generally U-shaped configuration to the module 110 along its longitudinal axis.

In some example embodiments, both side walls 120 have pipes 130 embedded therein. In some embodiments, the pipes 130 extend between a pair of inlet/outlet junctions 131 intersecting the side wall 120 of the module 110 at an end thereof, for allowing fluid to flow into and out of the pipe 130. The pipes 130 and inlet/outlet junctions 131 are described in greater detail below, under the heading entitled "Radiant Heating and Cooling of Modules".

The module 110 has a longitudinal dimension or length l. The main wall 210 may be defined in terms of a width w of the module 110 and the side walls 120 may be defined in terms of a height h of the module 110, as shown in FIG. 2. In some example embodiments, the side walls 120 are inset from opposing side edges of main wall 210 by a distance d to provide wings 230 of width d.

Each of the side walls 120 have a facing interior side wall surface 221 and an opposed exterior side wall surface 222 that are substantially parallel. The interior side wall surfaces 221 are separated by an interior main wall surface 211 and the exterior side wall surfaces 222 are separated by an exterior main wall surface 212 which is substantially parallel to the interior main wall surface 211.

In some example embodiments, the thickness $t_1$ of the side walls 120, that is, the separation between an interior side wall surface 221 and the corresponding exterior side wall surface 222, are sized for applicable structural guidelines. Such sizing easily accommodates any constraints imposed by the use of the utilicore 100 as a heating/cooling duct.

In some example embodiments, the side walls 120 are provided with a small degree of draft (not shown) between their interior side wall surfaces 221 and their corresponding exterior side wall surfaces 222 in order to facilitate de-molding or stripping of the module 110 from construction molds 300 (FIG. 3) as described herein, without significantly impacting the basic "squareness" of the side walls 120 relative to the main wall 210.

In some example embodiments, the intersection between the interior main wall surface 211 and one of the side wall surfaces 221, 222 or both, may be rounded to provide added strength, a more aesthetically pleasing appearance and to provide ease of cleaning the wall surfaces 211, 221, 222 and to facilitate the removal of the concrete from the mold 300.

In some example embodiments, the width w of the main wall 210 and the height h of the side walls 120 of the module 110 may each be multiples, respectively designated n and p, of a module dimension M. In some example embodiments, the depth d that the side walls 120 may be inset from the opposing side edges of main wall 210 may also be a multiple q of the module dimension M. In some example embodiments, the multiples n, p, q or any combination of any of them, may be integers or half-integers.

In same example embodiments, to conform to structural guidelines for typical North American commercial construction, the module dimension M may vary from 32 inches (80 cm) to 36 inches. In some example embodiments, for other countries, the module dimension M may be 90 cm.

In some example embodiments, again to conform to structural guidelines, with such module dimension M, a module 110 suitable for use as a cross-element 410 (FIG. 4) may have a main wall 210 width w with a multiple n of 4, a height h of side walls 120 with a multiple p of 1 and a width d of wings 230 with a multiple q of 0.5. Accordingly, the span s (FIG. 2) between the side walls 120 may be substantially a multiple of 3 times the module dimension M.

In some example embodiments, the module 110 may have a length l in the range of 10 to 20 meters.

Production of Modules

Figure 3:
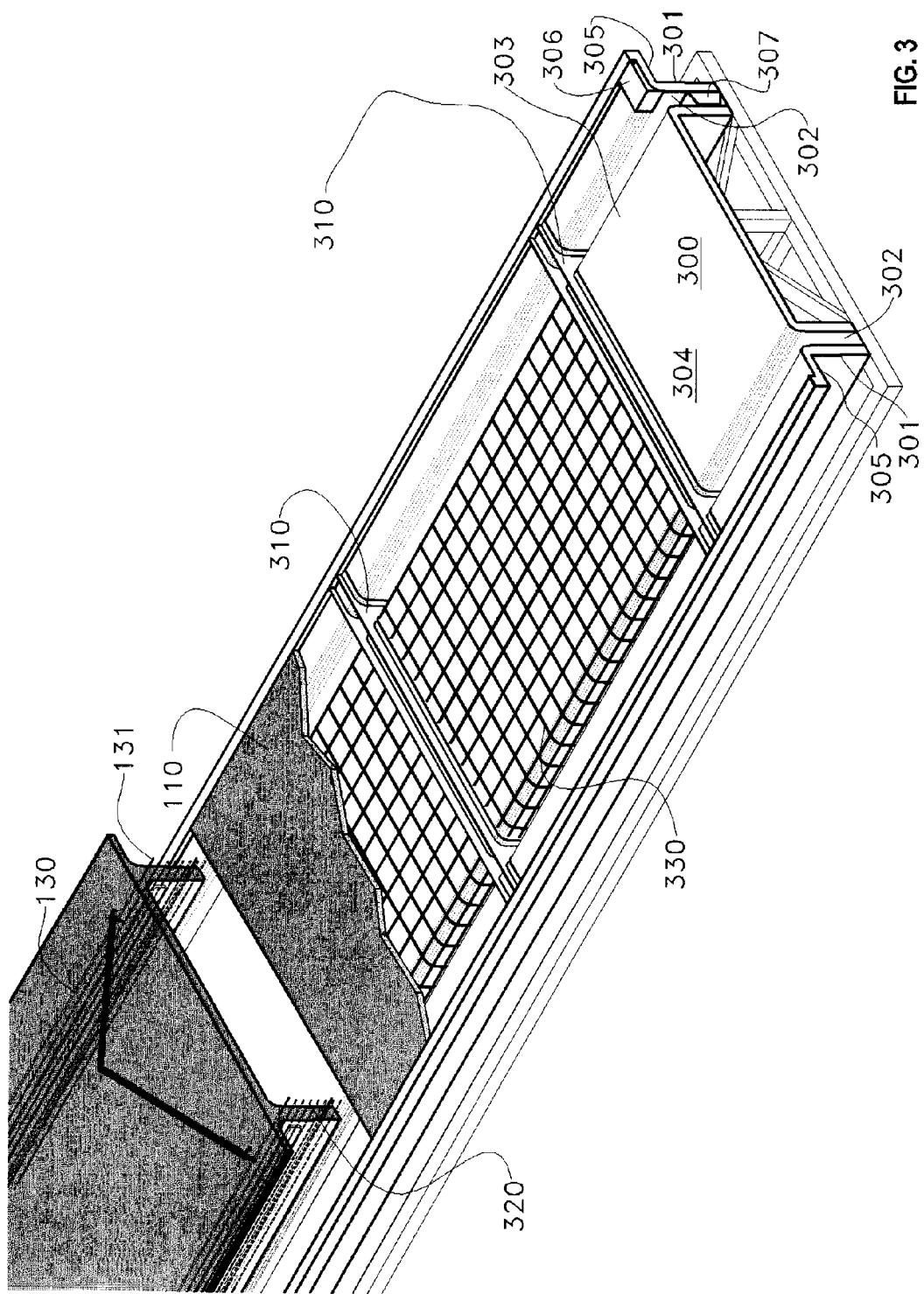
FIG. 3 is an isometric view of an example embodiment of a mold for use in constructing the module of FIG. 2 in accordance with an example embodiment of the present disclosure.

As shown in FIG. 3, in some example embodiments, the module 110 may be formed by the pouring of concrete around the embedded pipe 130 into an elongate mold 300. The mold 300 comprises a form that substantially reproduces the dimensions of the side walls 120 (facing downwardly into the mold 300) and the main wall 210, into which concrete may be poured to the top of the mold 300 to form the main wall 210 and the side walls 120 of the module 110.

The mold 300 comprises two spaced-apart elongate trenches 301 and a main wall form 303 extending from open upper ends of the trenches 301. The trenches 301 each define an elongate side wall cavity 302, which substantially reproduces the dimensions of the side walls 120 of the module 110 to be produced by the mold 300. The main wall form 303 defines a main wall cavity 304, which substantially reproduces the dimensions of the main wall 210 of the module 110 to be produced by the mold 300. The main wall cavity 304 is in communication with each of the side wall cavities 302, such that uncured concrete may be poured into the mold 300 to fill each of the side wall cavities 302 and the main wall cavity 304, for production of a module 110.

In some example embodiments, the length of the mold 300 exceeds the maximum length l of a module 110. The length l of modules 110 may vary according to their intended function. Modules 110 of lesser length may be obtained by inserting transverse headers 310 into the mold 300 to longitudinally divide the mold 300, define at least one partition within the mold 300 and restrict concrete poured into the partition from occupying the mold 300 beyond the partition. Modules 110 of lesser length may also be obtained by otherwise limiting the longitudinal extent to which the poured concrete will flow.

The mold 300 shown in FIG. 3 may provide for the construction of a double-T shaped module 110 with transverse outwardly extending wings 230. In some embodiments, this is accomplished by having the mold 300 extend laterally beyond at least one outer side of at least one of the trenches 301, defining at least one wing cavity 305. In such embodiments, the at least one wing cavity 305 allows for the formation of at least one wing 230 that extend beyond side walls 120. In some embodiments, the mold 300 extends laterally beyond outer sides of both trenches 301, defining one wing cavity 305 on each side of the mold 300, allowing the mold to produce a double T-shaped module 110.

In some example embodiments, blocks 307 may be positioned in the trenches 301, to restrict poured concrete to the portion of the side wall cavity 302 that is above the block. In this manner, the height h of the side walls 120 formed by the mold 300 can be reduced. However, because the height h of the side walls 120 achievable in a given mold 300 is limited, care should be taken in determining an appropriate depth of the mold 300 (as well as the width of the main wall form 303) to ensure modules of suitable dimension may be formed in the mold 300.

In some example embodiments, subject to minor constraints imposed by the addition of pipes 130 as described herein, which also may be positioned within the mold 300 to be embedded within the concrete when poured, to form the module 110, steel reinforcing rods 320 and steel mesh 330 or both may be positioned within the mold 300 to be embedded within the concrete when poured to form the module 110. In some example embodiments, the reinforcing rods 320 in the concrete may be prestressed.

The module 110 is a composite multi-task unitary product that may be mass-produced in a variety of lengths l using a single mold 300, without regard to the function to which it will be put and irrespective of in which building 400 or structure, project or country it may be used.

The production of multiple widths w or heights h of module 110 may involve deployment of a corresponding plurality of suitably dimensioned molds 300. In some example embodiments, a single mold 300 may be employed to produce modules 110 of differing height h, width w, width d thickness t, or any combination of any of them, for example, in non-limiting fashion, the mold 300 may have a depth corresponding to a maximum height h of the module 110, and modules 110 of a lesser height h may be produced for such a mold 300 by deploying blocks 307 into parts of the mold 300 corresponding to the side walls 120 having a height that is substantially equal to the difference in relative heights in the trenches 301 of the mold 300 and the side wall(s) 120, to displace concrete from such parts.

The availability of multiple sizes of module 110 provides flexibility to service a wide range of building plans and arrangements demanded by a (geographically, culturally and architecturally) diverse marketplace, including but not limited to the application as horizontal floor/ceiling cross-members 410 (FIG. 4), or indeed as horizontal beam 1020 (FIG. 10) or vertical columns 1030 (FIG. 10) or both, as disclosed in example embodiments herein.

In some example embodiments, because of the modular nature of the module 110, a single universal mold 300 is used (and re-used for years both within the same site and in parallel and/or subsequent projects). Accordingly, the mold 300 may be a relatively more expensive but high quality and precise open steel mold, which is vibrated and trowelled to provide precise dimensional stability and a high quality final surface finish to both the inner walls 211, 221 and exterior walls 222, not generally available with conventional concrete forming techniques. While the mold 300 is more expensive, its high repeat use in the manufacturing process makes it less expensive than single use conventional wood forming which is labour intensive and wasteful. Those having ordinary skill will appreciate that concrete cast in a steel mold 300 produces a substantially finer surface relative to the finish achieved using conventional wooden forms as the concrete forming technique. Such final surface finishes can accommodate an interior finish such as paint, fabric or wallpaper or an exterior finish such as paint, or a cladding of concrete, wood, aluminum, vinyl, brick or stone, without significant or any additional surface preparation.

The modular concept allows high repetition of similar modules 110 and the ability to link one module 110 to the next in an infinite variety of module 110 arrangements and permits each module 110 to have substantially identical serpentine pipes 130 to provide radiant heating/cooling capability. Because the pipes 130 have been pre-engineered, pre-fabricated, mass-produced and then dropped into place in the mold 300 of a composite pre-engineered and pre-fabricated building product prior to casting or pouring, both the pipes 130 and the modules 110 share material, labour, transportation and installation costs, which may significantly reduce the overall cost of the building 400.

In some example embodiments, the mold 300 may be provided to users as part of a kit, comprising a quantity of pourable concrete for use with the mold 300. Additional components may be included with the kit, such as blocks 305 for insertion into the wing cavity 305, spacer blocks 307 for positioning in the trenches 301, transverse headers 310, reinforcing rods 320 and mesh 330 for embedding within the concrete to be poured into the mold 300, and a pipe 130 for embedding within a side wall 120 of the module 110.

Thus, the use of the composite module 110, including without limitation, when produced using mold 300, may eliminate a number of layers of construction materials and a number of labour activities. This may provide an improved cost/benefit ratio in terms of both quality and quantity when compared to conventional on-site construction techniques. This process may substantially eliminate on-site concrete forming and on-site multiple-layered construction materials and labour activities.

In same example embodiments, a U-shaped module may be constructed using a similar mold (not shown), in which lateral sides of the main wall form 303 may be of increased height and decreased width relative to the double-T shaped module 110, to permit the formation of a main wall 210 that does not extend beyond the extent of the side walls 120. In some example embodiments, mold 300 may be employed to construct U-shaped modules by positioning blocks 305 in the wing cavities 305 to restrict poured concrete from occupying the mold 300 within the wing cavities 305.

As discussed in later sections, in some example embodiments, U-shaped modules may be employed as beams 1020 (FIG. 10) or columns 1030 (FIG. 10) or both. In such embodiments, such U-shaped modules are structural and as a result, will have different dimensions than the double-T shaped modules 110 employed as cross-members 410 (FIG. 4) discussed in the next section. Thus, it is unlikely that a common mold 300 will be employed to provide both double-T shaped modules 110 to be employed as cross-members 410 and U-shaped modules to be employed as beams 1020 and columns 1030.

Using Modules as Cross-Members

Figure 4:
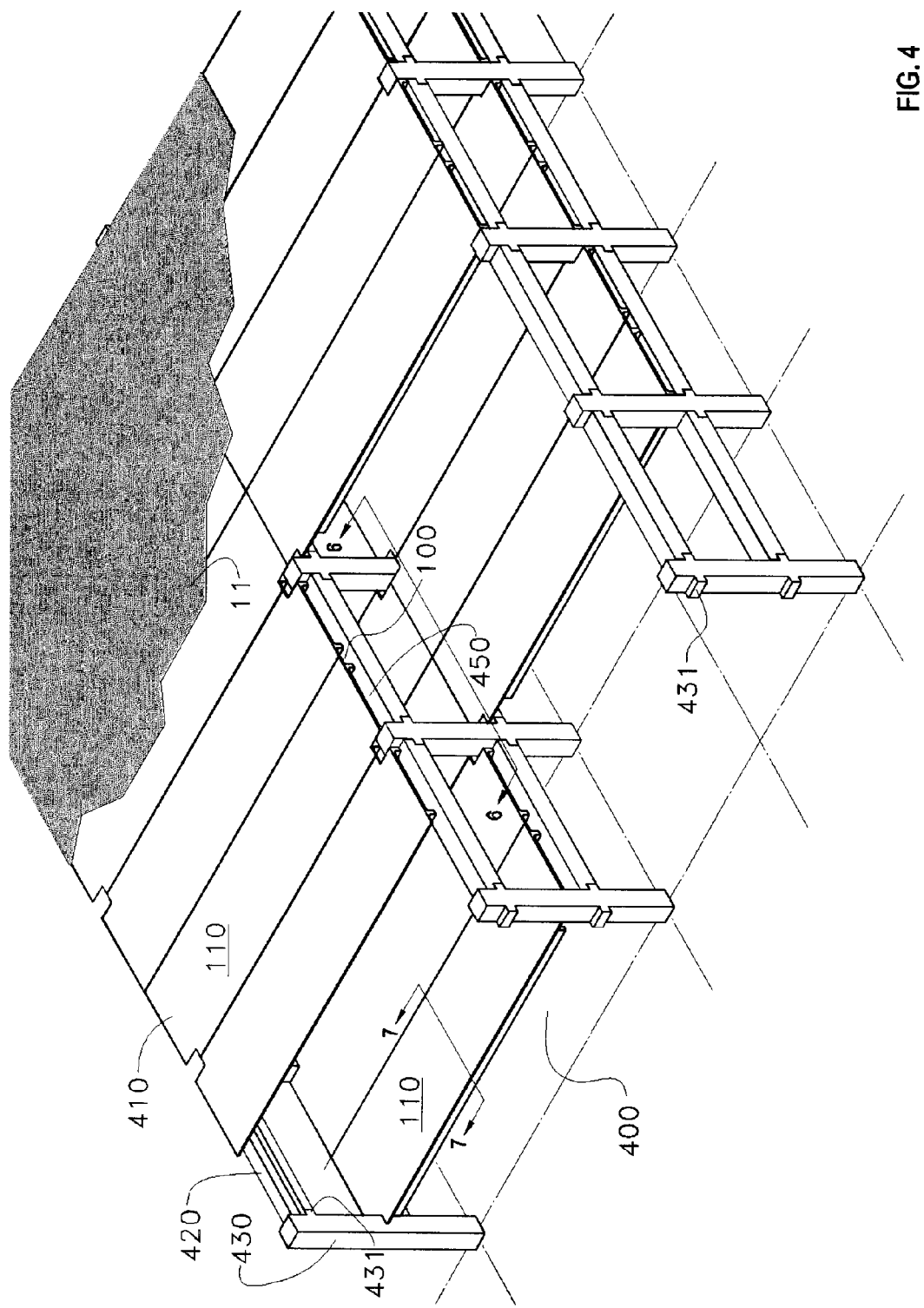
FIG. 4 is an isometric view from above of a building in which a plurality of the modules of FIG. 2 are deployed to form ceiling/floor elements of two storeys, in accordance with an example embodiment of the present disclosure.

Turning now to FIG. 4, in some example embodiments, in addition to its role as the primary heating and cooling source, with its embedded radiant heating/cooling pipe 130, the module 110 may be deployed as a floor/ceiling cross-member 410 of a building 400, supported at each end by a substantially horizontal transverse beam 420, which may be supported at each end by a substantially vertical column 430. In such a configuration, the air is heated and cooled within the full length of every module 110. This may serve as the primary source of heating and cooling, so that in some example embodiments, only the radiant fluid circulated through the pipes 130 are returned to a central fluid circulation resource 810 (FIG. 8).

In some example embodiments, notches 510 (FIG. 5) may be formed in the side walls 120 of the module 110, each for receiving a beam 420. In some example embodiments, the beams 420 are supported on shoulders 431 of the column 430. In some example embodiments, at least one of the cross-members 410 may be supported at least one intermediate point 1040 (FIG. 10) by a beam 420. In some example embodiments, at least one of the beams 420 may be supported at least one intermediate point (not shown) by a column 430.

In such a deployment, the module 110 may be oriented such that its longitudinal axis is substantially horizontally oriented with its side walls 120 descending from the main wall 210. Thus, the main wall 210 of cross-member 410 may form a substantially horizontal surface that defines part of a ceiling of a lower storey and concurrently, part of a roof element or part of a floor of an upper storey, as the case may be, of building 400. If used as part of a floor, the cross-members 410 may be clad with a poured concrete floor layer 11 or other suitable flooring material. In some example embodiments, radiant heating/cooling may also be provided to such floor layer 11 by positioning at least one tube (not shown) over the cross-members 410, to be embedded within the poured concrete floor layer 11 and filled with heated or cooled fluid (as the case may be) in conventional fashion.

In some example embodiments, each cross-member 410 extends in the longitudinal direction. In some example embodiments, the length l of modules 110 used as cross-members 410 may be in the range of 10 to 20 meters. This dimension is sometimes controlled by the spans employed for parking, which dictate the span size and multiples thereof throughout the building 400.

In some example embodiments, the cross-member 410 extends over substantially half a portion of the width of the supporting beam 420, permitting a second cross-member 410, parallel, and in some example embodiments collinear, with the first cross-member 410, to extend over and be supported by a portion of the beam 420.

A plurality of cross-members 410 are arranged in a common plane such that the side walls 120 of adjacent cross-members 410 are substantially parallel and positioned side-by-side, as shown in FIG. 4. In some example embodiments, adjacent cross-members 410 may be relatively longitudinally offset (shown in example fashion in FIG. 10).

In some example embodiments, the separation between the side walls 120 of adjacent cross-members 410 may be an integer multiple of the module dimension M.

In same example embodiments, the width d of the wings 230 may be a half-integer multiple of the module dimension M. In some example embodiments, the width d of wing 230 may be M/2 so that the separation between the side walls 120 of adjacent cross-members 410 may be the module dimension M, that is M=2d. In some example embodiments, the span s between the side walls 120 of the cross-member 410 is 3 times the module dimension M.

When the cross-members 410 are so arranged in a side-by-side configuration to define a ceiling/floor structure, the wing 230 and adjacent side wall 120 on each side of each module 110 define a utilicore 100, extending parallel to and between adjacent ceiling vaults 450.

In some example embodiments, the height h of the side walls 120 may be substantially 0.8 m and the width d of the wings 230 may be substantially 0.4 m, resulting in a utilicore 100 substantially 0.8 m wide by 0.8 m high.

In some example embodiments, the span s between the side walls 120 of a cross-member 410 is large relative to the width 2d of the utilicore 100, so that the overall aesthetic impression created is of a high vaulted ceiling periodically interrupted by relatively narrow utilicores 100. As may be better seen in FIG. 5, which shows the cross-members 410 in perspective view from below, in some example embodiments, the vaulted ceiling elements 450 take advantage of the height h of the side walls 120, which is conventionally lost, for example, when conventionally-constructed buildings or double-T slabs are provided with suspended ceilings over their entire area. Therefore, the net interior height of each floor of a building is higher when the suspended ceiling is eliminated.

The aforementioned aesthetic impression may be fostered by painting the exposed surfaces 211, 221 of the vaulted ceiling elements 450, by introducing indirect lighting elements 720 (FIG. 7), directing light upward against such exposed surfaces 211, 221 of the vaulted ceiling elements 450 (permitting diffuse light to be reflected downwardly), or any combination of any of these. In some example embodiments, the at least one indirect lighting element 720 is secured to a distal end of the side wall 120 with upward-extending deflectors 721 for reflecting light upward against the vaulted ceiling element 450, without substantially detracting from the impression of high, wide ceilings. In some example embodiments, such lighting element 720 may be an incandescent, halogen or fluorescent light fixture or other suitable lighting source.

In some example embodiments, a transverse light fixture 722 may be deployed between and supported by adjacent light fixtures 720 to provide additional light to the vaulted ceiling elements 450 and to provide a surface for the attachment of interior partition walls 735 that are of substantially the same height as partition walls 735 that are fastened to the underside of the side walls 120. In some example embodiments, such light fixture 722 may be an incandescent, halogen or fluorescent light fixture or other suitable lighting source.

Utilicores Formed from Cross-Members

Figure 5:
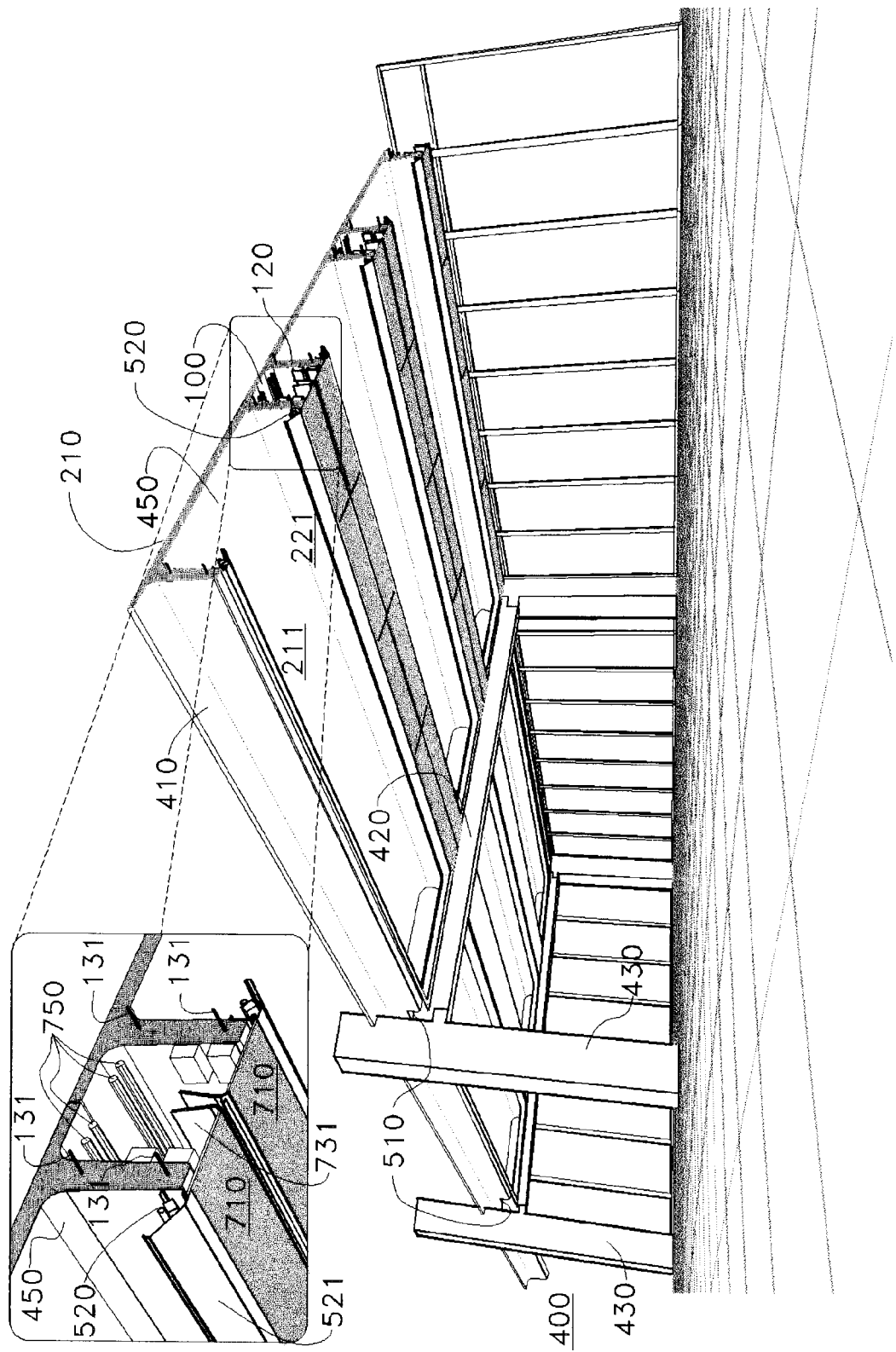
FIG. 5 is a perspective view from below of a first storey of the building of FIG. 4.
Figure 6:
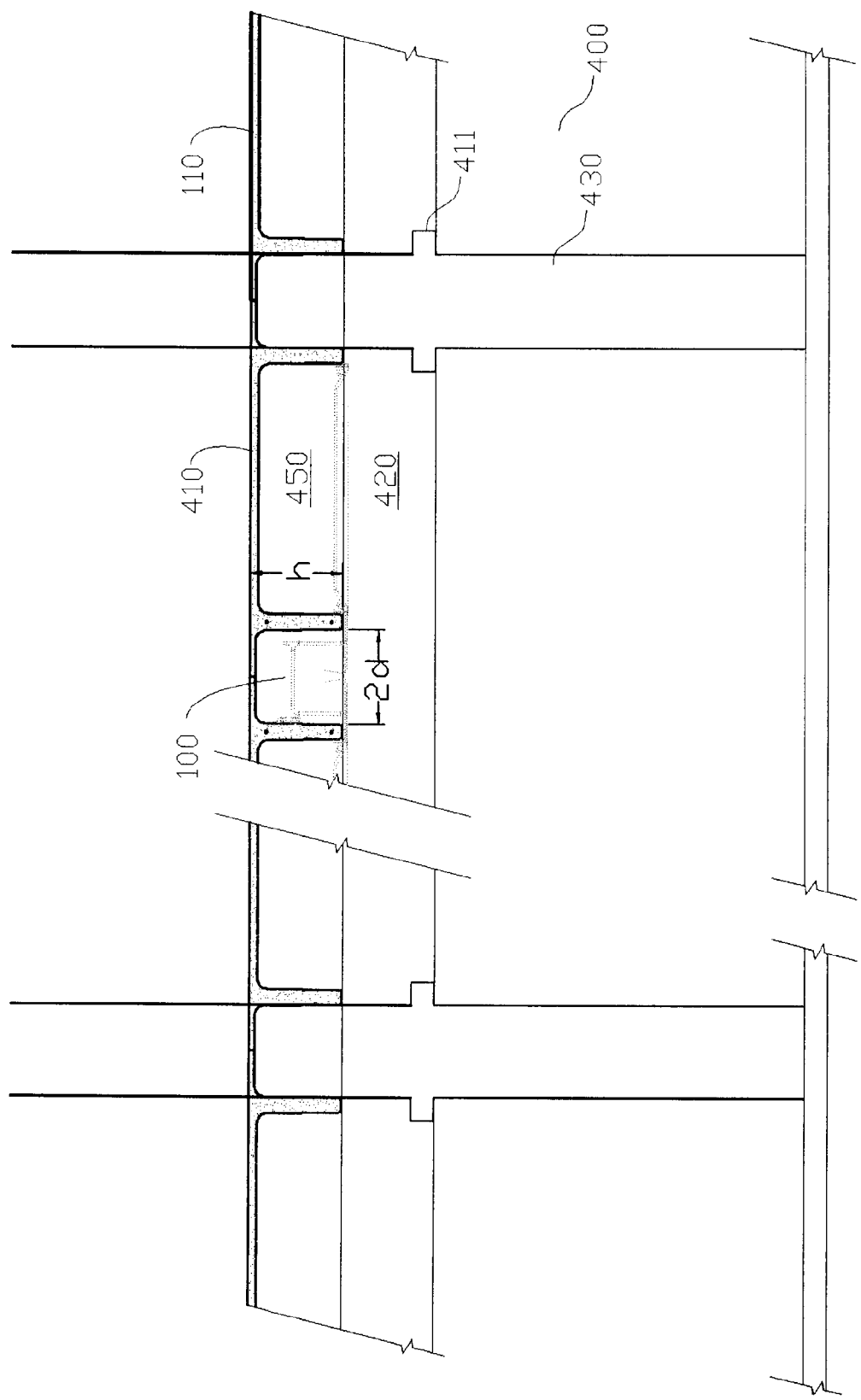
FIG. 6 is a cross-sectional end view of a plurality of the modules of FIG. 2 deployed to form ceiling/floor elements of at least one storey of the building of FIG. 4, taken along section 6-6.
Figure 7:
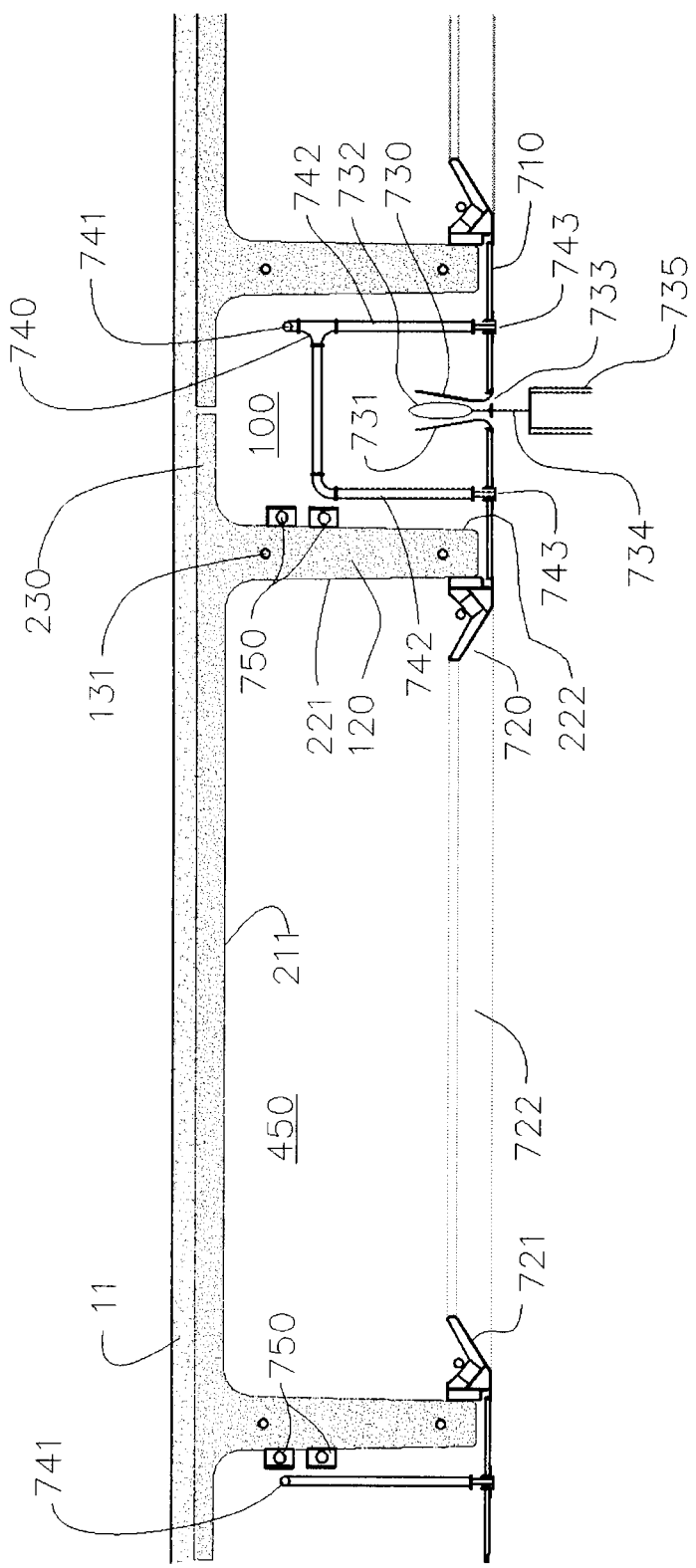
FIG. 7 is a cross-sectional view of a plurality of the modules of FIG. 2 deployed to form ceiling/floor elements of at least one storey of the building of FIG. 4, taken along section 7-7.

Referring now to FIGS. 5, 6 and 7, and as described above, in some example embodiments, utilicores 100 may be defined by arranging cross-members 410 in a side-by-side configuration. In such a configuration, the abutting wings 230 of the adjacent cross-members 410 form a top wall of the utilicore 100, and the adjacent side walls 120 of each adjacent cross-member 410 each form side walls of the utilicore 100. A utilicore 100 is thus defined, being an elongate space extending along the length of the adjacent cross-members 410, having a rectangular cross-section of width 2d and height h, as shown in FIG. 6. In some example embodiments, specifically in embodiments wherein 2d=h, the utilicore 100 has a substantially square cross-section.

In same example embodiments (not shown), the width 2d of the utilicore 100 is substantially the same as the width in the same direction of the column 430 and the cross-members 410 are positioned such that a utilicore 100 is substantially aligned with each column 430. This permits the vaulted ceiling elements 450 to extend beyond and adjacent to the columns 430 to minimize shadows and accentuate the impression of high, wide ceilings.

In some embodiments, the utilicores 100 extend along the floor/ceiling surface formed by the cross-members 410 at places in between the columns 430.

Figure 9:
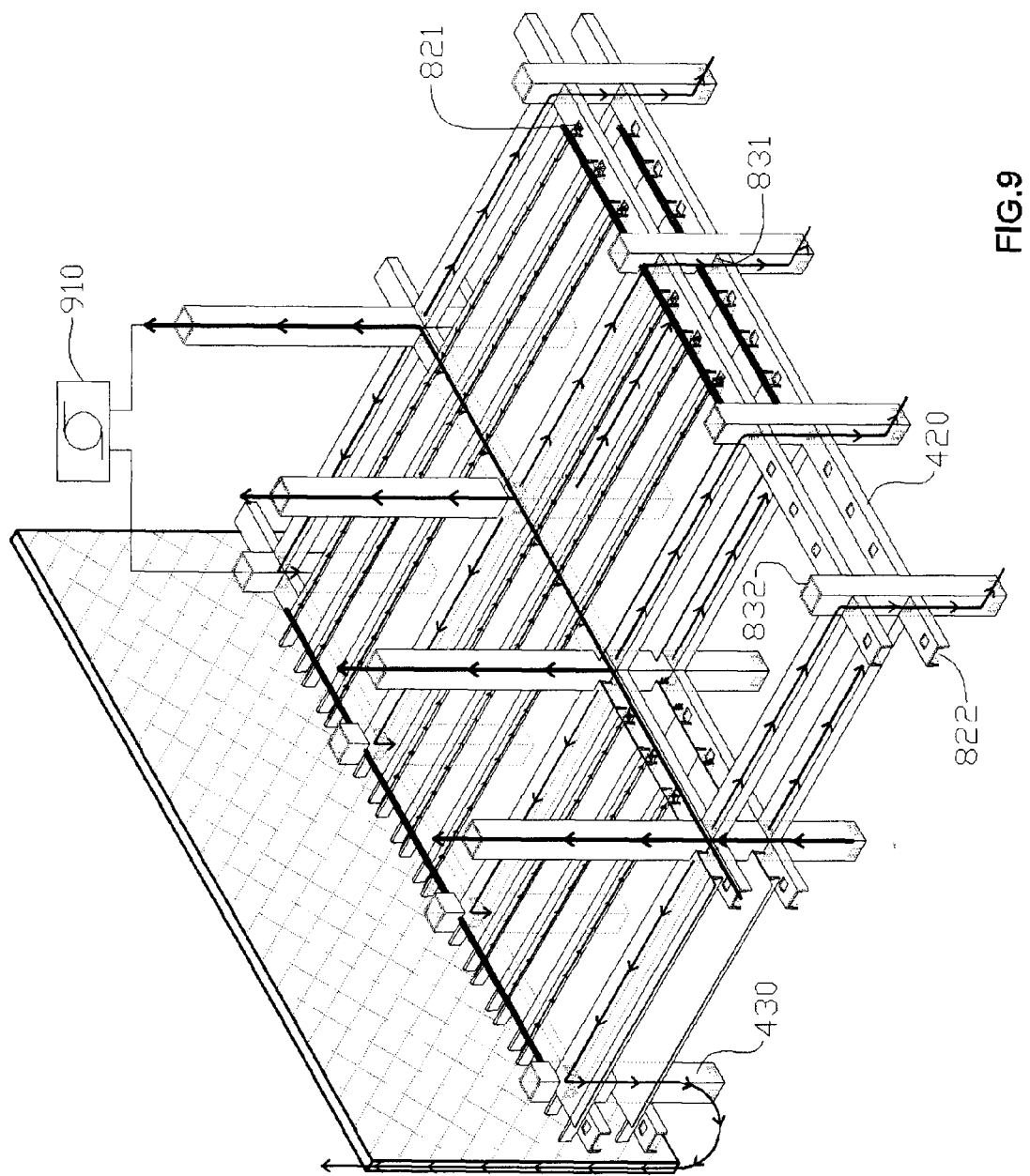
FIG. 9 is an isometric view from above, partially cutaway, of a portion of an example embodiment of at least one storey of the building of FIG. 4, showing an example of air circulation loops throughout utilicores according to FIG. 1, defined by modules according to FIG. 2, and employed as structural elements including cross-elements, beams and columns.

Referring in particular to FIG. 7, in some example embodiments, the utilicore 100 may be employed to provide an air diffusion system 730, such as variable air volume (VAV). In some example embodiments, air is forced laterally through the utilicore 100 by a central forced air supply 910 (FIG. 9).

In some example embodiments, portions of a given utilicore 100 may be separated by one or more baffles 850 (FIG. 8) extending either transversely or longitudinally relative to the utilicore 100, and oriented vertically or horizontally, so that one portion may be designated and configured for air flow in a direction opposite to that of another portion. Such baffles 850 define air flow junctions (not shown) in the utilicore 100 or between utilicores 100 or both.

In some example embodiments, other air conditioning devices, such as humidity, electronic or air cleaning devices or humidifiers may be placed in utilicores 100.

In some example embodiments, air temperature-controlled motorized dampers 1140 (FIG. 11) may be positioned be placed at junctions of utilicores 100, which may be activated by thermostats, to control and transfer heated or cooled air from one utilicore 100 to another, or at junctions of and beams 420 and columns 430 to substantially equalize the temperature in a building, to designate certain areas for specific temperature conditions, or to re-circulate or exhaust the air as appropriate.

In some example embodiments, the lower extremities of the side walls 120 of adjacent modules 100 defining the utilicore 100 may be covered by at least one panel or ceiling tile 710 that serves to substantially inhibit uncontrolled downward flow of air being carried by the air diffusion system 730. Such panels 710 may comprise suspended acoustical ceiling tiles, gypsum board, or other suitable panel materials, which are fastened to the side walls 120 using methods well known in the art. The panels 710 may be attached to the underside of the distal end of the side walls 120 or to the sides of the distal ends of the side walls (not shown).

In some example embodiments, the air diffusion system 730 may comprise a longitudinal trough 731 that extends partially or substantially along the length of the utilicore 100. In some example embodiments, the trough 731 is open in a downward direction and feeds into a longitudinal gap 733 in the panel 710 to provide air communication between the utilicore 100 and the building space below the panel 710. In some example embodiments, the trough 731 is tapered as it extends downwardly toward the panel 710. The trough 731 surrounds the gap 733 and channels flow of air through the gap 733.

In some example embodiments, a series of VAV longitudinal dampers 732 aligned end to end substantially occupies the gap 733 in the panel 710 along the longitudinal length of the trough 731. In some example embodiments, each of the dampers 732 is movable between a closed position wherein air is substantially inhibited from escaping the utilicore 100 through the gap 733 and an open position wherein air is permitted to escape the utilicore 100 through the gap 733 otherwise occupied by the damper 732, for example, by deflating an air-filled bellows.

In some example embodiments, the movement of the dampers 732 between the open and closed positions is controlled mechanically or pneumatically. In some example embodiments, such movement is controlled by an environmental sensor (not shown), which may in some example embodiments be a thermostat, to permit localized heating or cooling of an area through the introduction of warm or cool air through the opening when the damper 732 is in the open position.

In some example embodiments, a small fin 734 may be provided inside the air diffusion system 730 to deflect air in multiple directions. In some example embodiments, the fin 734 may provide an attachment point for partition walls 735 in the building space below.

As may be better seen in FIGS. 5 and 6, and in particular FIG. 7, in some example embodiments, the utilicore 100 may also be employed to hide from view mechanical or electrical systems housed within the utilicore 100. In some example embodiments, such mechanical systems may include a fire suppression system 740, or at least one service utility conduit and junction/device box 750, or any combination of any of these, in a variety of configurations, one non-limiting example of which is shown.

In some example embodiments, the fire suppression system 740 may comprise a longitudinal fire suppression pipe 741 that extends substantially along the length of the utilicore 100. The fire suppression pipe 741 contains a supply, under pressure, of fire suppression material, which in some example embodiments may be water, foam, Halon™, other suitable substance or any combination of any of them. Periodically along the length of the fire suppression pipe 741, at least one subordinate pipe 742 may extend transversely outwardly from the fire suppression pipe 741 and extend substantially downwardly to engage a sprinkler head 743 disposed through the panel 710 to permit downward dispersal of the fire suppression material.

A wide variety of service utility conduits 750 may be mounted to, or wound through, the utilicores 100 or both. Non-limiting examples of such service utility conduits 750 including electrical power cables, telephone cable, internet cables, natural gas lines, plumbing supply pipes, plumbing return pipes, compressed air tubes, lab or industrial ventilation ducts, audio-video system cables, speaker cables, home or office automation cables, alarm system cables, conduits or trays for holding such cables, pipes and tubes or any combination of any of these. These conduits 750 serve to route such services around the building 400 in order to provide access throughout the building 400 to electrical, telecommunications, network communications, heating, cooling, plumbing, compressed air, ventilation, audio-video, automation, alarm capabilities and the like, where and as appropriate for use within the building spaces of each storey of the building 400. Due to the large size of the utilicore 100, these conduits 750 do not substantially impede the movement of air.

Radiant Heating and Cooling of Modules

The use of concrete as the primary construction component of the module 100 provides some advantages with regard to heating and cooling. Concrete is recognized as a material that has a high capacity to absorb and store heat and is one of the main contributors to the thermal mass of a building 400. Thus, the concrete construction of the module 100 acts as energy storage batteries and as an integral thermal mass radiator.

Thermal mass is considered to be a measure of a building's ability to store, regulate and dissipate internal heat. A building with high thermal mass will heat up slowly, but concomitantly will cool down slowly as well. For purposes of energy conservation, this is considered advantageous because the building effectively acts like a heating/cooling battery in that it stores and releases heat slowly, moderating fluctuations in temperature. Thus, buildings 400 comprised of predominantly concrete, such as those constructed using the module 100, have a high thermal mass, especially when compared to metal ductwork, steel structures or building envelopes composed of hollow concrete or brick or composed of wood or metal studs covered by drywall.

The ability of the concrete to absorb, retain and release the radiant heating and cooling within the utilicores 100, to modify the ambient temperature within the utilicores 100, and the ambient temperature within the entire building 400, is at least in part due to the entire composite structure including the utilicores 100, have a pre-finished bare concrete surface. This means that the concrete is the final surface throughout the building 400, providing an opportunity to substantially maximize the principle of thermal mass retention and release.

While thermal mass concrete is conventionally energized by passive means such as solar heating and daylight, the benefits of a high thermal mass concrete module 100 is increased by incorporating in the side walls 120, continuous lengths of hollow pipe 130 for containing therein fluid at a temperature that is different from the ambient temperature of air flowing through a utilicore 100 defined by the module 100, sufficient to radiate or to capture a desired amount of heat.

In some example embodiments, the pipe 130 may be ½ inch, ¾ inch or 1 inch in diameter, typically composed of flexible plastic. In some example embodiments, the pipe 130 extends in a substantially serpentine pattern several times along the length l of the module 110 in a substantially spaced-apart configuration throughout the side wall 120 of the module 110.

In some example embodiments, the pipe 130 extends between a pair of inlet/outlet junctions 131 intersecting the side wall 120 of the module 110 at an end thereof. In some example embodiments, inlet/outlet junctions 131 of each module 110 are disposed toward a common end, or opposite ends of the longitudinal axis of the module 110, or in some example embodiments, out of the interior side wall 221.

In some example embodiments, the inlet/outlet junction 131 may comprise a spliced connection comprising a coupler secured by one or more compression rings and/or solder, a tap, a hose, a valve, or an externally threaded (male) connection and an internally threaded (female) connection.

The pipe 130 may be filled with fluid such as, by way of non-limiting example, water or glycol or any combination of any of these, which may be maintained and, may circulate through the pipe 130, at a temperature that is different from the ambient temperature of the module 110.

The provision of fluid through the pipes 130 of the module 100 at a temperature that differs from the ambient temperature of air flowing through a utilicore 100 defined by the module 110, provides supplemental heating or cooling or both capability to the inherent thermal mass of the module 110.

In the summer, heat energy absorbed by the side walls 120 of each module 110, by way of non-limiting example, during the day, will tend to be moderated by the relatively cooler night temperature from the previous evening. This inherent summer cooling effect can be accentuated through the circulation of cooled fluid through the pipe 130.

In the winter, the walls 210, 120 of the module 110 absorb and radiate heat, by way of non-limiting example, during the day. This inherent winter heating effect can be accentuated through the circulation of heated fluid through the pipe 130 in the side wall 120, for example, by supplying the pipe 130 with fluid from a fluid circulation resource 810 (FIG. 8) such as, by way of non-limiting example, a hot water heater. As the ambient temperature cools, by way of non-limiting example, at night, the module 110 releases this heat internally (and to some extent externally) within the building 400 and moderates the cooling effect of the change in temperature.

Where the module 110 is employed in a ceiling/floor element 410 substantially as described herein, in which utilicores 100 are defined between proximate side walls 120 of adjacent modules 110, and where air is forced through such utilicores 100 to provide forced air heating or cooling or both to the building spaces below the vaulted ceiling element 450, the inherent thermal mass capability of the module 110, supplemented by the provision of fluid at a temperature different from the ambient temperature of air flowing through a utilicore 100 defined by the module 110, through the pipes 130 in the side walls 120, tends to heat or cool, as the case may be, the air flowing substantially laterally through the utilicore 100 defined by the module 110, which may dispense with, or in some example embodiments, substantially alleviate or supplement conventional heating/cooling load borne by an HVAC system (not shown).

The enclosure, in some example embodiments, of the pipes 130 entirely within the side walls 120 of the module 110, including, without limitation, through pre-casting in mold 300 as described in relation to FIG. 3, means that the inclusion of the pipes 130 does not have any substantial adverse structural, visual or other impact on the building 400.

The use of moveable motorized baffles 1140 can help control the flow of air to the parts of the building 400 that may not otherwise be as well serviced. It can help move air from a part of a building 400 of one temperature to another part of the building 400 with a different temperature either by mechanical means or by the forces of natural ventilation as described herein.

Fluid Circulation Loop(s)

As may be better seen in FIG. 8, in some example embodiments, the fluid, flowing through pipes 130 in the modules 110, at a temperature that is different from the ambient temperature of air flowing through a utilicore 100 defined by the module 110, may be circulated throughout the building 400 in one or more fluid circulation loops. In some example embodiments, a fluid circulation loop may comprise the following:

Fluid may be supplied by a fluid source 811 such as a reservoir or tank and circulated along the at least one fluid circulation loop by a circulator 812 such as a pump (not shown). The fluid source 811 may be located in one central location in the building 400 or there may be many smaller fluid sources 811 throughout the building 400. In some example embodiments, the fluid may be set or maintained or both at a temperature that is different from the ambient temperature of the module 110 by a heating/cooling plant 813 such as a conventional oil, natural gas or electric hot water tank, boiler, inline or tankless water heater, solar panel for heating a coil of fluid, air conditioning unit, refrigeration unit, heat pump, geothermal heat pump for pumping relatively warmer fluid from beneath the earth's surface during the winter and relatively cooler fluid during the summer, or any combination of any of these. When solar, geothermal or other renewable technology is used as the heating/cooling plant 813, the pipe 130 in at least one side wall 120 of the module 110 serving as a utilicore 100 provides a renewable or "green" energy distribution system.

In some example embodiments, the fluid source 811, circulator 812, heating/cooling plant 813 (collectively shown as fluid circulation resource 810) or any combination of any of them may form part of a common element, such as, by way of non-limiting example, a hot water tank. In some example embodiments, the fluid source 811, circulator 812, heating/cooling plant 813 or any combination of any of them may be commonly located, or in proximity to one another, at one or more convenient locations in, throughout or proximate to the building 400, such as, by way of non-limiting example, a boiler room in a basement or on a roof.

The fluid may be provided to an inlet junction 131, of at least one pipe 130 in at least one module 110 defining at least one utilicore 100 of at least one storey of the building 400, by a supply pipe or series of supply pipes 840 in fluid connection with the fluid circulation resource 810. At each inlet junction 131, there may be a valve which is controlled by a thermostat to regulate the amount of fluid being supplied to the utilicore.

In some example embodiments, such supply pipes 840 may extend substantially vertically upward through at least one vertical air passageway 830 in at least one column 430 from a storey on which the fluid circulation resource 810 is located to the storey on which the at least one utilicore 100 is situated. In some example embodiments, such supply pipes 840 may extend through a vertical air passageway 830. Thus, such supply pipes 840 are effectively hidden from view.

In some example embodiments, such supply pipes 840 may extend substantially horizontally along a given storey, which may be the storey on which the fluid circulation resource 810 is located or the storey on which the at least one utilicore 100 is situated, through at least one horizontal air passageway 820 in at least one beam 420 associated with such storey. Thus, such supply pipes 840 are effectively hidden from view.

In some example embodiments, such supply pipes 840 may be mounted outside of the beam 420. If such supply pipes 840 are located just above the level of the floor as shown in FIG. 8, they may provide supplementary heating or cooling to occupants of the building 400 if constrained in a baseboard or other radiator housing 841 and configured (such as, by way of non-limiting example, forming into additional vertically disposed coils and locating them along a floor or wall baseboard) so as to act as a baseboard or radiator heating/cooling element.

The fluid emanating from an outlet junction 131 of at least one pipe 130 in at least one module 110 defining at least one utilicore 100 of at least one storey of the building 400 may be provided to a return pipe or series of return pipes 842 in fluid connection with the fluid circulation resource 810.

In some example embodiments, such return pipes 842 may extend substantially vertically downward through at least one vertical air passageway 830 in at least one column 430 from a storey on which the at least one utilicore 100 is situated to the storey on which the fluid circulation resource 810 is located. Thus, such return fluid pipes 842 are effectively hidden from view.

In some example embodiments, the supply and return fluid pipes 840, 842 are placed along the outside perimeter of each floor, providing the primary distribution of piped fluids to all modules 110 and providing an automatic baseboard 841 heating and cooling capability at a major source of heating and cooling loss in a building 400. The radiant heating/cooling provides a substantially even distribution of piped fluids to all utilicores 100 to provide a more controlled temperature throughout the building 400.

In same example embodiments, such return pipes 842 may extend substantially horizontally along a given storey, which may be the storey on which the at least one utilicore 100 is situated or the storey on which the fluid circulation resource 810 is located, through at least one horizontal air passageway 820 in at least one beam 420 associated with such storey. Thus, such return pipes 842 are effectively hidden from view.

Such supply pipes 840, return pipes 842, baseboard elements 841 or any combination of any of them may be comprised of fixed tubing, flexible tubing or any combination of any of them.

In some example embodiments, a plurality of fluid circulation loops may be employed for different storeys or wings of building 400 or portions thereof for improved responsiveness, energy conservation or to isolate the fluid supply of a portion of the building 400 from the fluid supply 811 of another portion of the building 400 to prevent cross-contamination or to support separate billing for HVAC services. Such flexibility in configuration may be achieved by judicious placement and configuration of the fluid connections (by way of non-limiting examples, tees, Y-junctions, and manifolds) between and within utilicores 100, supply pipes 840, return pipes 842 or any combination of any of them and taking advantage of the multiplicity of available utilicores 100, columns 430 and associated vertical air passageways 830 or portions thereof contained therein, beams 420 and associated horizontal air passageways 820 or portions thereof contained therein or any combination of any of them.

Because the fluid is substantially constantly circulated by the circulator 812, most of the fluid will be, at any given time, moving through the pipes 130, supply pipes 840 and return pipes 842. As such, only a small fluid source 811 may be called for.

Further, the speed of travel of the fluid through the fluid circulation loop(s) may be relatively low as heat is transferred using a temperature differential between the ambient temperature of air flowing through a utilicore 100 defined by the module 110 and the fluid. As such, a relatively low capacity circulator 812 may be called for. Still further, the temperature differential between the ambient temperature of air flowing through a utilicore 100 defined by the module 110 and the fluid may be substantially only a few degrees. As such, a relatively small heating/cooling plant 813 may be called for. Indeed, if supply and return pipes 840, 842 include a number of coils that are configured to attract solar energy (by way of non-limiting example, roof-mounted or exterior wall-mounted coils) or a geo-thermal source, little or no supplementary heating by a conventional heating/cooling plant 813 may be called for.

In some embodiments, heating or cooling or both of the fluid circulated within the pipes 130 of modules 110 employed in the construction of a building 400 may take advantage of passive solar heating by locating the supply or return pipe 840, 842 along at least one exterior or exposed face of the building 400 that has consistent sun exposure. Thus, by merely maintaining circulation of the fluid, radiant heating or cooling (depending upon the season) may be supplied to interior building spaces in a highly economical manner. Within the zone between every column, passive solar heating can be managed effectively.

Forced Air Circulation Loop(s)

With reference now to FIG. 9, just as fluid flowing through the pipes 130 in the modules 110 defining utilicores 100 may form part of one or more fluid circulation loops within the building 400, in some example embodiments, air may be supplied to and drawn through and from the utilicores 100 along one or more air circulation loops.

In some example embodiments, each of these air circulation loops comprises at least one air flow path extending longitudinally through at least one utilicore 100 that is substantially horizontal and aligned with at least one module 110 configured as a cross-member 410. In some example embodiments, a plurality of such lateral utilicores 100 may form part of a common air circulation loop.

In some example embodiments, the lateral flow of air through a plurality of such utilicores 100 may be configured to be in the same direction. In some example embodiments, the lateral flow of air may be configured to be in opposite directions. In some example embodiments, certain of such utilicores 100 may be designated and configured as supply passages while other of such utilicores 100 may be designated and configured as return passages. In some example embodiments, the lateral flow of air through utilicores 100 designated and configured as supply passages may be in the same direction. In some example embodiments, the lateral flow of air through utilicores 100 designated and configured as return passages may be in the same direction.

In some example embodiments, air may be supplied to such lateral utilicores 100 through at least one aperture 821 interconnecting the utilicore 100 with a horizontal air passageway 820 extending within at least one of the beams 420 supporting the ceiling/floor elements 410 defining the utilicore 100. In some example embodiments, the horizontal air passageway 820 may be substantially the entirety of the interior of the beam 420, if the beam 420 is closed, or a tube or duct 1021 (shown in dashed outline in FIG. 10) extending along the interior or exterior of the beam 420.

In some example embodiments, the horizontal flow of air through horizontal air passageways 820 designated and configured as supply passages may be in the same direction. In some example embodiments, the horizontal flow of air through horizontal air passageways 820 designated and configured as return passages may be in the same direction.

In some example embodiments, certain horizontal air passageways 820 may be designated and configured as supply passages while other horizontal air passageways 820 may be designated and configured as return passages, as shown by way of non-limiting example in FIG. 9 and described in greater detail below.

In some example embodiments, air may be supplied to the horizontal air passageway 820 through at least one aperture 831 interconnecting it with a vertical air passageway 830 extending within at least one of the columns 430 supporting the beam 420. In some example embodiments, the vertical air passageway 830 may be substantially the entirety of the interior of the column 430.

In some example embodiments, certain vertical air passageways 830 may be designated and configured as supply passages while other vertical air passageways 830 may be designated and configured as return passages, as shown by way of non-limiting example in FIG. 9 and described in greater detail below.

In some example embodiments, the vertical flow of air through vertical air passageways 830 designated and configured as supply passages may be in the same direction. In some example embodiments, the vertical flow of air through vertical air passageways 830 designated and configured as return passages may be in the same direction.

In some example embodiments, the fire suppression material may be supplied to the fire suppression pipe 741 for a given utilicore 100 by at least one supplementary fire suppression pipe (not shown) extending along a given horizontal air passageway 820 or vertical air passageway 830 or both in fluid connection with the fire suppression pipe 741, allowing the fire suppression material in each utilicore 100 to be commonly sourced within the building 400.

In some example embodiments, conduits 750 for a given utilicore 100 may be supplied by at least one associated conduit (not shown) mounted to or wound through a given horizontal air passageway 820 or vertical air passageway 830 or both, in communication with the conduit 750, allowing the conduit 750 in each utilicore 100 to be commonly sourced within the building 400 and to obscure such conduits from view.

In some example embodiments, a horizontal air passageway 820 may be in communication with a utilicore 100, a vertical air passageway 830, another horizontal air passageway 820 (by way of non-limiting example, where the horizontal air passageways 820 are aligned end-to-end), and an air supply 910 or any combination of any of them.

In some example embodiments, a vertical air passage 830 may be in communication with a utilicore 100, another vertical air passageway 830 (by way of non-limiting example, where the vertical air passageways 830 are aligned end-to-end), a horizontal air passageway 820, air supply 910, or any combination of any of them.

Using the network of air circulation loops, each comprising one or more of one or more utilicores 100 associated with cross-members 410, one or more horizontal air passages 820, and one or more vertical air passages 830, as described herein, air flow may be provided in a desired predetermined arrangement from air supply 910 to virtually any location of the building 400 with substantial precision, in some example embodiments, as follows:

Air may be drawn into the building 400 through the roof-mounted air supply 910. The drawn-in air may be circulated substantially vertically downward along at least one supply vertical air passageway 830. Air supplied in at least one supply vertical air passageway 830 may be circulated substantially horizontally to at least one supply horizontal air passageway 820 on at least one storey of the building 400. Air supplied in at least one supply horizontal air passageway 820 may be circulated substantially horizontally to at least one supply utilicore 100 on the same storey of the building 400 for distribution to the associated building space below it through diffusers 730.

Further, in some example embodiments, air may be drawn up from the building space into an air return (not shown) in a return passageway, which may be a utilicore 100, a horizontal air passageway 820, a vertical air passageway 830 or any combination of any of them. Air collected in at least one return utilicore 100 may be circulated substantially horizontally to at least one associated return horizontal air passageway 820 for the same storey of the building 400. Air collected in at least one return horizontal air passageway 820 may be circulated substantially horizontally to at least one associated return vertical air passageway 830. Air collected in at least one return vertical air passageway 830 on at least one storey of the building 400 may be circulated substantially vertically upward to the roof-mounted air supply 910 or vented or both.

In some example embodiments, a plurality of air circulation loops may be employed for different storeys or wings of building 400 or portions thereof for improved responsiveness, energy conservation or to isolate the air supply of a portion of the building space from the air supply of another portion of the building space to prevent cross-contamination or to support separate billing for HVAC services or to move air from the warmer side of the building to the cooler side or vice-versa. Such flexibility in configuration may be achieved by judicious placement and configuration of the baffles 1140 between and within utilicores 100, horizontal air passageways 820, vertical air passageways 830 or any combination of any of them and taking advantage of the multiplicity of available utilicores 100, horizontal air passageways 820 or portions thereof, vertical air passageways 830 or portions thereof or any combination of any of them.

The location of such baffles 1140 define air flow junctions in the passageway 820, 830 or between passageways 820, 830 or both. In some example embodiments, such baffles 1140 may be movable under motor control.

Because the volume of air that may occupy the utilicore 100 is large in relation to the volume of air that may occupy a conventional air duct, the velocity of air travelling longitudinally along the utilicore 100 may be reduced. Coupled with the fact that the air is travelling along a substantially thick, rigid concrete surface, as opposed to the substantially thin, flexible sheet metal surface of a conventional duct, there may be a substantial reduction in noise associated with the heating/cooling function.

Using Modules as Beams

Figure 10:
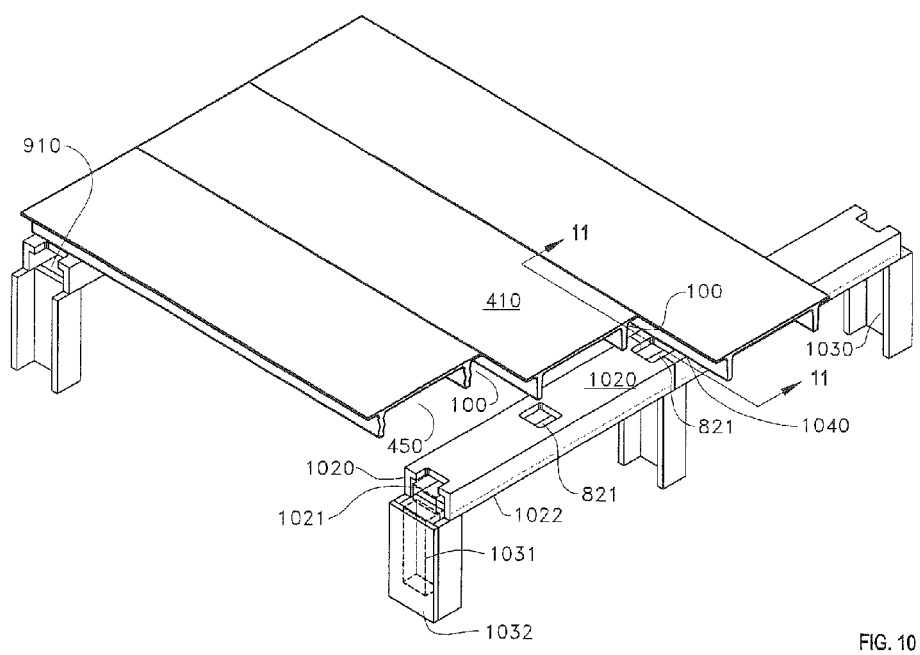
FIG. 10 is an isometric view from above, partially cutaway, of a portion of an example embodiment of at least one storey of the building of FIG. 4, in which U-shaped modules are employed as both beams and columns.
Figure 11:
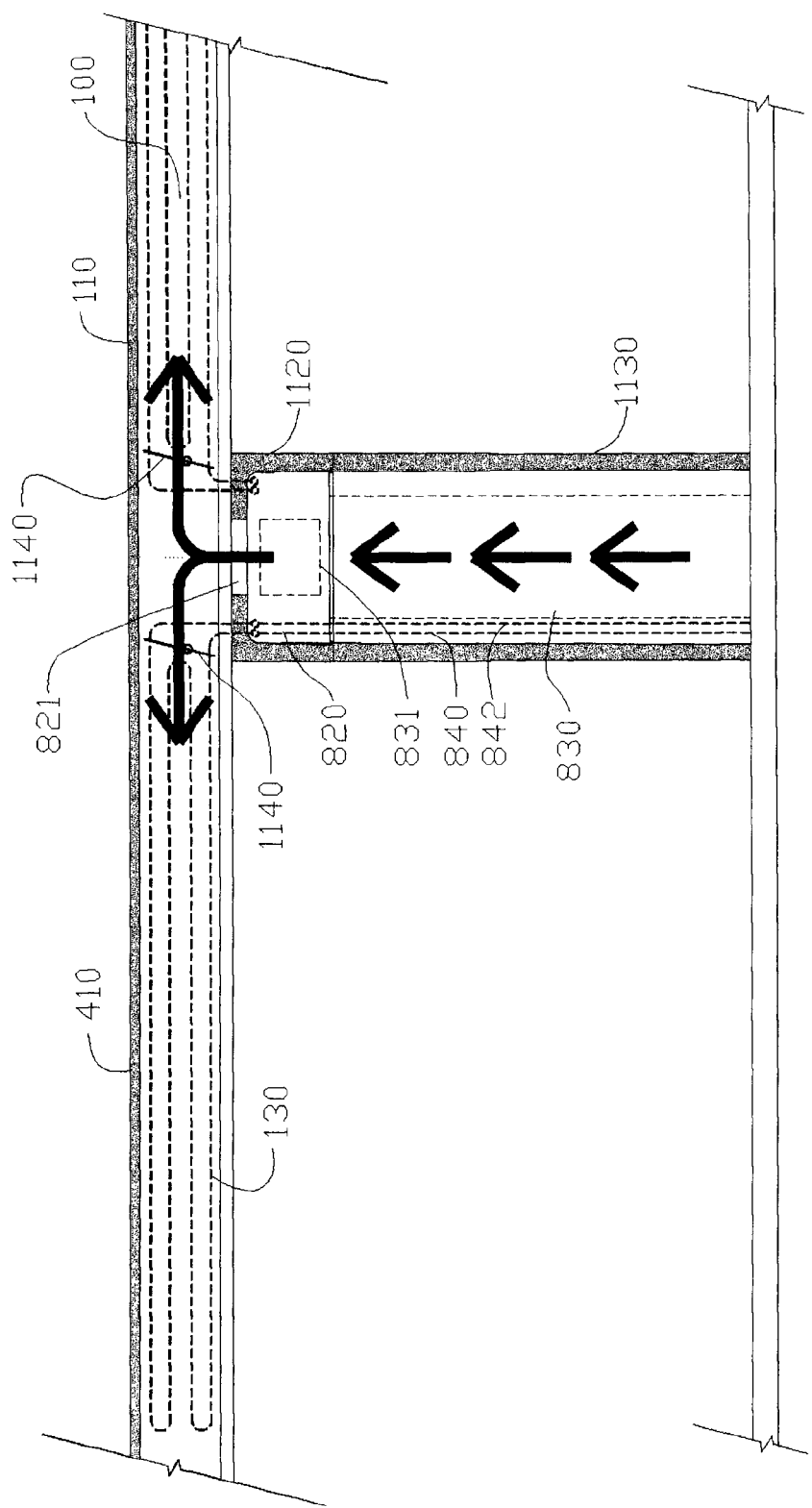
FIG. 11 is a cross-sectional side view of the module of FIG. 2 deployed to form a ceiling/floor element of at least one storey of the building of FIG. 4 and supported by the U-shaped modules of FIG. 10, deployed as beams and columns, taken along section 11-11.

In some example embodiments, in addition to its role as the primary heating and cooling source, with its embedded radiant heating/cooling pipes 130, to form a complete heating and cooling system for the entire building, referring to FIGS. 8, 9, 11 and particularly FIG. 10, a U-shaped module may be oriented such that its longitudinal axis is substantially horizontally oriented with the main wall 210 positioned above and resting upon the side walls 120 to form a horizontal beam 1020. The air is heated and cooled within the full length of every module 110 used as a beam 1020 in some example embodiments, to provide additional heating and cooling.

In some example embodiments, the distal ends of side walls 120 of modules 110 used as beams 1020 may be covered to form a hollow beam 1020 to permit the transport of air through it as part of the HVAC system employed in the building 400. In such situation, the interior of module serves as horizontal air passageway 820. Such air may be passed between beam 1020 and a vertical air passageway 830 in a supporting column 430 through aperture 831 in column 430 in a surface separating them and between beam 1020 and a utilicore 100 through aperture 821 in a surface separating them.

In some example embodiments, the distal ends of side walls 120 mate with exposed ends of side walls 120 of a second module. In some example embodiments, aperture 821 may be situated within one of the modules.

In some example embodiments, the distal ends of side walls 120 are covered by a panel 1022. In some example embodiments, the panel 1022 is composed of suspended acoustical ceiling tiles, gypsum board, or other suitable panel materials, which are fastened to the side walls 120 using methods well known in the art.

In some example embodiments, the dimensions of modules employed as beams 1020 may be different than those used as cross-elements 410. By way of non-limiting example, a module employed as a beam 1020 may have a main wall 210 width w with a multiple n of 2, a height h of side walls 120 with a multiple p of 1. In some example embodiments, the length l of utilicores 100 used as beams 1020 may be substantially about 8M (6.4 meters) or 12M (9.6 meters) to coordinate with the dimensions of the cross-members 410.

The large cross-sectional size of the beams 1020 facilitate movement of large amounts of air from one part of the building 400 to another, in accordance with demand within the building 400, or due to the orientation of the building 400. For example, it may be desirable to move air between the north side of the building 400 and the south side, in order to equalize temperature disparities because of sun exposure.

In some example embodiments, such beams 1020 comprising modules may employ at least one of the associated pipes 130 as a supply pipe 840, return pipe 842, or any combination of any of them. In addition to substantially obscuring such supply pipes 840 or return pipes 842 from view, employing at least one of the pipes 130 in this manner may dispense with the provision of separate supply pipes 840 and return pipes 842 and may provide supplementary radiant heating/cooling capability to the associated air circulation loop while the air is being delivered to or returned from the utilicore 100 through the beam 1020 and columns 430.

Using Modules as Columns

In some example embodiments, in addition to its role as the primary heating and cooling source, with its embedded radiant heating/cooling pipes 130, to form a complete heating and cooling system for the building, referring to FIGS. 8, 9, 11 and particularly FIG. 10, in some example embodiments, a U-shaped module may be oriented such that its longitudinal axis is substantially vertically oriented with a bottom end of the main wall 210 and side walls 120 abutting against a horizontal floor surface (which, in some example embodiments, may be a floor composed of cross-members 410) to form a column 1030.

In some example embodiments, the distal ends of side walls 120 of modules used as columns 1030 may be covered to form a hollow column 1030 to permit the transport of air through it as part of the HVAC system employed in the building 400. In such situation, the interior of module serves as vertical air passageway 830. Such air may be passed between column 1030 and a horizontal air passageway 820 in a beam 420, 1020 supported thereon through aperture 831 in column 1030 in a surface separating them.

In such a configuration, the air is heated and cooled within the full length of every module used as a column 1030 in some example embodiments to provide additional heating and cooling.

In some example embodiments, the distal ends of side walls 120 mate with exposed ends of side walls 120 of a second module. In some example embodiments, aperture 831 may be situated within one of the modules.

In some example embodiments, the distal ends of side walls 120 are covered by a panel 1032, which may be structural or non-structural. In some example embodiments, the panel 1032 is composed of metal studs and gypsum board, or other suitable panel materials. In some example embodiments, aperture 831 may be situated within the panel 1032. In some example embodiments, the panel 1032 may be replaced by at least one access panel or door to provide access to building service utilities, which may extend from floor to floor through at least one column 1030 or otherwise to provide a storage or other closet facility.

In some example embodiments, the dimensions of modules employed as columns 1030 may be different from those used as cross-elements 410 or beams 1020 or any combination of any of them. By way of non-limiting example, a module employed as a column 1030 may have a main wall 210 width w with a multiple n of 2, a height h of side walls 120 with a multiple p of 0.5 (if the column 1030 employs two facing modules) or 1 (if the column 1030 remains open-ended or is covered by a panel 1032).

The large cross-sectional size of the columns 1030 facilitate movement of large amounts of air from one part of the building 400 to another, in accordance with demand within the building 400, or due to the orientation of the building 400. For example, it may be desirable to move air between the north side of the building 400 and the south side, in order to equalize temperature disparities because of sun exposure.

In some example embodiments, the length l of the module employed as a column 1030 may substantially correspond to a number q of commercial stories s. In some example embodiments, for typical North American commercial construction, a storey may be considered to be substantially 12 feet in height.

In some example embodiments, the contact positions of facing modules, or module and panel 1032 pairs may be substantially sealed by a grout or other suitable gap sealing compound (not shown).

In some example embodiments, such columns 1030 comprising modules may employ at least one of the associated pipes 130 as a supply pipe 840, return pipe 842 or any combination of any of them. In addition to substantially obscuring such supply 840 or return pipes 842 from view, employing at least one of the pipes 130 in this manner may dispense with the provision of separate supply pipes 840 and return pipes 842 and may provide supplementary radiant heating/cooling capability to the associated air circulation loop while the air is being delivered to or returned from the utilicore 100 through the column 1030.

Employing the Chimney Effect

Figure 12:
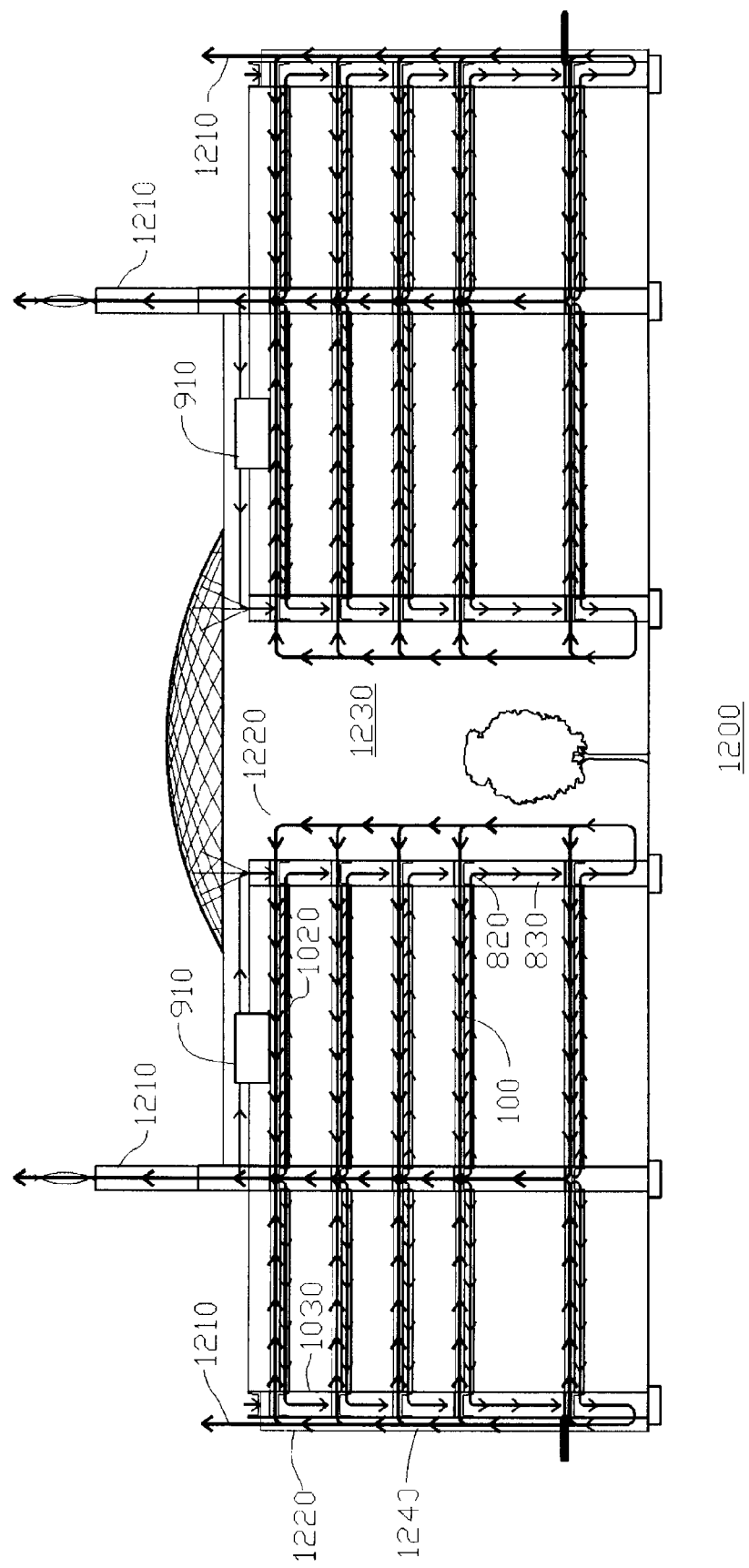
FIG. 12 is a cross-sectional side view of an example embodiment of the building of FIG. 4, showing an example configuration of air circulation loops employing the chimney effect.

Turning now to FIG. 12, there is shown an example embodiment of a building 1200 employing modules 110 to form cross-elements 410 and U-shaped modules as beams 1120 and columns 1130, but substantially dispensing with operational use of the air supply 910 by employing the chimney effect.

The chimney effect is caused by the principle that hot air rises, and the higher the column, the greater the chimney effect or flow of air in the column. As air is drawn up a column by the chimney effect, it is able to draw air from adjacent parts of the building. The chimney effect is well known to those skilled in the art to encourage natural ventilation and infiltration.

In some example embodiments, vertically extending structures or chimneys 1210 are established at interior/exterior boundaries 1220 of the building 1200, such as exterior walls of the building 1200. Additional exterior boundaries 1220 may be introduced by designing open-air or lightly enclosed interior spaces, such as atriums 1230. Such atriums 1230 may also be used to condition air or assist in moving air from one part of the building 1200 to another.

In the context of the present disclosure, such chimneys 1210 are comprised of columns 1030. In some example embodiments, multiple columns 1030 may be provided, by way of non-limiting example, through the establishment of baffles 1140, such that a return passageway 830 lies adjacent the exterior boundary 1220 and between such boundary 1220 and a supply passageway 830. The supply passageways 830 exhaust at the bottom of the building 1200 into the return passageways 830 and the return passageways 830 exhaust at the top of the building 1200 to the exterior. In some example embodiments, additional chimneys, such as by additional columns 1030, are created in the interior of the building 1200.

With such a structure, initial mechanical assistance to commence and in some example embodiments to supplement, on an ongoing basis, the flow of air through the air circulation loops is provided through air supply 910.

Air may also be exhausted from the building 1200 through the chimneys 1210 by mechanical means or natural ventilation. In some example embodiments, fresh air or re-circulated air may also be passed through a double-skin glazed cavity wall 1240 on the exterior of the building 1200 where it may be warmed by solar radiation during winter and conditioned by planting materials (called a "green wall"). Conversely, in summer, solar radiation may be captured in the cavity and exhausted before it heats the interior spaces of the building 1200, thus reducing the demand for air conditioning/cooling.

It will be apparent that various modifications and variations may be made to the embodiments disclosed herein, consistent with the present disclosure, without departing from the spirit and scope of the present disclosure.

In the foregoing disclosure, for purposes of explanation and not limitation, specific details are set forth such as particular architectures, interfaces, techniques, etc. in order to provide a thorough understanding of the present disclosure.

While example embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

In some instances, detailed descriptions of well-known devices, circuits, and methods are omitted so as not to obscure the description of the present disclosure with unnecessary detail. All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner.

Certain terms are used throughout to refer to particular components. Manufacturers may refer to a component by different names. Use of a particular term or name is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of a device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

The terms "couple" or "communicate" in any form are intended to mean either a direct connection or indirect connection through some interface, device, intermediate component or connection, whether electrically, mechanically, chemically, or otherwise.

References in the singular form include the plural and vice versa, unless otherwise noted.

The purpose of the Abstract is to enable the relevant patent office or the public generally, skill in the art who are not familiar with patent or legal terms or phraseology, to quickly determine from a cursory inspection the nature of the technical disclosure. The Abstract is neither intended to define the scope of this disclosure, which is measured by its claims, nor is it intended to be limiting as to the scope of this disclosure in any way.

In accordance with a first broad aspect of an embodiment of the present disclosure there is provided a utilicore for substantially containing air flowing longitudinally therethrough, the utilicore having at least one wall comprised of a poured high thermal mass material with at least one pipe embedded therein during a pouring process, the at least one pipe for circulating a fluid throughout the at least one wall at a temperature that is different from an ambient temperature of the air flowing through the utilicore, for effecting heat transfer through the at least one wall between the fluid in the at least one pipe and the air flowing through the utilicore.

In some example embodiments, the utilicore may comprise at least a respective portion of first and second elements, at least one of which comprising the at least one wall, in juxtaposed orientation to substantially contain air flow therewithin. In some example embodiment, the utilicore may comprise at least one panel for substantially containing air flowing therewithin to a longitudinal air passage. Such panel may comprise at least one gap for permitting air flowing along the utilicore to escape therefrom. In some example embodiments, the utilicore may comprise a trough to surround the gap and to channel air flow through the gap, at least one damper movable between an open position in which air may escape the utilicore through the gap and a closed position in which air may be substantially inhibited from escaping the utilicore therethrough. Such damper may be movable between the open and closed positions under motor control, under direction of an environmental sensor.

In some example embodiments, the high thermal mass material may be concrete and the fluid may be water or glycol or both. Such fluid may be at a temperature that is higher than an ambient temperature of the air flowing through the utilicore such that heat transfer is effected to raise the temperature of the air flowing through the utilicore. On the other hand, such fluid may be at a temperature that is lower than an ambient temperature of the air flowing through the utilicore such that heat transfer is effected to lower the temperature of the air flowing through the utilicore.

In some example embodiments, the at least one pipe is supplied with fluid by a fluid resource in fluid communication therewith such that fluid from the at least one pipe is returned to the fluid resource. The fluid resource may comprise a fluid source in fluid communication with the at least one pipe, a circulator in fluid communication with the at least one pipe, a heating/cooling plant for bringing fluid supplied to the at least one pipe to a temperature that is different from an ambient temperature of the air flowing through the utilicore or any combination of any of them. Thus, the at least one pipe and the fluid resource may comprise a fluid circulation loop.

In some example embodiments, the air flowing through the utilicore may be in communication with an air supply for forcing air through the utilicore through at least one air passageway, where the utilicore, the air supply and the at least one air passageway comprise an air circulation loop.

In accordance with a second broad aspect of an embodiment of the present disclosure there is provided an elongate monolithic poured concrete building construction module having a substantially planar main wall and at least one side wall extending substantially parallel to a longitudinal axis, the at least one side wall having a pipe embedded therewithin during a pouring process, one side wall forming at least part of the portion of one of the elements described above in juxtaposed orientation to define a utilicore for substantially containing air flow therewithin along the longitudinal axis.

In some example embodiments, the longitudinal axis may be substantially parallel to the main wall, the at least one side wall comprising two spaced-apart side walls, each terminating at a common surface of the main wall and the at least one side wall of the module terminates at the main wall of such module at a point intermediate between respective sides of the main wall, to define a wing of the main wall extending between a proximate side of the main wall and the side wall, the wing forming at least part of the portion of one of the elements defining a utilicore.

In accordance with a third broad aspect of an embodiment of the present disclosure there is provided a storey-defining structure for a building comprising a plurality of at least one of the poured construction modules described above, each module supported at least two points by a support structure, each module being oriented such that distal ends of the side walls thereof engage the support structure, the at least one side wall and the main wall defining an elongate arch, the modules being juxtaposed in parallel relation to define at least one elongate utilicore between the arches.

In some example embodiments, the support structure may comprise at least one substantially horizontal beam supporting the modules at one of the at least two points, each beam being supported at least two points by a column.

In some example embodiments, such beam is formed of at least one of the construction modules described above wherein at least one of the pipes in the beam is in fluid communication with at least one pipe in a module supported on the beam in juxtaposed relation to define the utilicore and the at least one beam has a substantially horizontal air passageway associated therewith and extending therewithin and in communication with the utilicore to facilitate the flow of air therethrough. Such horizontal air passageway may comprise an interior chamber of the beam or be secured to the beam or both and is in communication with at least one of a utilicore, another horizontal air passageway, a substantially vertical air passageway and an air supply through an aperture formed therewithin at a point of intersection therebetween.

In some example embodiments, the support structure may comprise at least one substantially vertical column supporting at least one of the horizontal beams at one of the at least two points thereof.

In some example embodiments, such column is formed of at least one of the construction modules described above wherein at least one of the pipes in the beam is in fluid communication with at least one pipe in a module, supported on a beam supported by the column, in juxtaposed relation to define the utilicore and the at least one column has a substantially vertical air passageway associated therewith and in communication with a utilicore supported on a beam supported by the column, to facilitate the flow of air therethrough. Such vertical air passageway may comprise an interior chamber of the column or be secured to the column or both and is in communication with at least one of a utilicore, a horizontal air passageway, another vertical air passageway and an air supply through an aperture formed therewithin at a point of intersection therebetween.

In some example embodiments, the vertical air passageway exhausts proximate to a top end thereof to the exterior to facilitate creation of a chimney effect to promote air flow through the utilicores. This may be facilitated by positioning the vertical air passageway proximate to an exterior/interior boundary of the structure.

In some example embodiments, the utilicore may house at least one mechanical system, which may be an electrical power cable, telephone cable, internet cable, natural gas line, plumbing supply pipe, plumbing return pipe, compressed air tube, lab or industrial ventilation duct, audio-video system cable, speaker cable, home or office automation cable, alarm system cable, conduit for holding such cables, fire suppression system and any combination of any of these.

In some example embodiments, the structure may comprise at least one lighting element secured to a side wall of at least one module for directing light upward against the elongate arch to provide downward illumination by diffuse reflection.

In accordance with a fourth broad aspect of an embodiment of the present disclosure there is provided a mold for producing the monolithic poured concrete building construction module described above, the mold comprising two spaced-apart elongate trenches, each defining a longitudinal side wall cavity for accepting a pipe for embedding within a wall of the module during a pouring process, and a main wall form extending from open upper ends of the trenches, the main wall form defining a substantially planar main wall cavity in communication with each of the side wall cavities, the side wall cavities and main wall cavity for receiving poured concrete therewithin and supporting said concrete until removed.

In some example embodiments, the main wall form may extend laterally beyond at least one outer side of at least one trench, to define at least one corresponding wing cavity extending beyond an outer extremity of the at least one trench. At least one wing block may be positioned in at least one of the wing cavities, for restricting poured concrete from occupying the mold within the at least one wing cavity. At least one spacer block may be positioned in at least one of the side wall cavities, for restricting poured concrete to a region of the side wall cavity above the at least one spacer block. At least one transverse header may be disposed within the mold for longitudinally dividing the mold to define at least one partition and restricting poured concrete from occupying the mold beyond the at least one partition.

In accordance with a fifth broad aspect of an embodiment of the present disclosure there is provided a kit of parts for use in producing such a monolithic poured concrete building construction module, comprising a quantity of pourable concrete and the mold described above.

In some example embodiments, such kit may comprise the at least one wing block, the at least one spacer block, the at least one transverse header, at least one portion of mesh for embedding within concrete poured into the mold, at least one reinforcing bar for embedding within concrete poured into the mold, the at least one pipe described above for embedding within concrete poured into a corresponding at least one side wall cavity and any combination of any of these.

Other embodiments consistent with the present disclosure will be apparent from consideration of the specification and the practice of the disclosure disclosed herein. Accordingly the specification and the embodiments disclosed therein are to be considered examples only, with a true scope and spirit of the disclosure being disclosed by the following numbered claims:

What is claimed is:

1. A story-defining structure for a building comprising a plurality of elongate monolithic poured concrete building construction modules, each module having a substantially planar main wall and at least one side wall extending substantially parallel to a longitudinal axis, the at least one side wall having a pipe embedded therewithin during a pouring process, the at least one side wall forming at least part of a respective portion of first and second elements in juxtaposed orientation to form a utilicore defining a channel unbounded along one side for substantially directing air flow longitudinally therethrough, the utilicore having at least one wall that forms part of the channel comprised of a poured high thermal mass material with at least one pipe embedded therein during a pouring process, the at least one pipe for circulating a fluid throughout the at least one wall at a temperature that is different from an ambient temperature of the air flowing through the channel, for effecting heat transfer through the at least one wall between the fluid in the at least one pipe and the air flowing through the channel, each module supported at at least two points by a support structure, each module being oriented such that distal ends of the side walls thereof engage the support structure, the at least one side wall and the main wall thereof defining an elongate arch, the modules being juxtaposed in parallel relation to define at least one elongate utilicore between the arches, wherein the support structure comprises at least one substantially horizontal beam supporting the modules at one of the at least two points, each beam being supported at at least two points by a column.

2. The structure according to claim 1, wherein the beam is formed of at least one of the construction modules.

3. The structure according to claim 2, wherein at least one of the pipes in the beam is in fluid communication with at least one pipe in a module supported on the beam in juxtaposed relation to define the utilicore.

4. The structure according to claim 1, wherein the at least one beam has a substantially horizontal air passageway associated therewith and in communication with the utilicore to facilitate the flow of air therethrough.

5. The structure according to claim 1, wherein the support structure comprises at least one substantially vertical column supporting at least one of the horizontal beams at one of the at least two points thereof.

6. The structure according of claim 5, wherein the column is formed of at least one of the construction modules.

7. The structure according to claim 6, wherein at least one of the pipes in the beam is in fluid communication with at least one pipe in a module, supported on a beam supported by the column, in juxtaposed relation to define the utilicore.

8. The structure according to claim 5, wherein the at least one column has a substantially vertical air passageway associated therewith and in communication with a utilicore supported on a beam supported by the column, to facilitate the flow of air therethrough.

\* \* \* \* \*